United States Patent
Hwang et al.

(10) Patent No.: US 9,082,035 B2
(45) Date of Patent: Jul. 14, 2015

(54) CAMERA OCR WITH CONTEXT INFORMATION

(75) Inventors: Kyuwoong Hwang, Daejeon (KR); Te-Won Lee, Seoul (KR); Duck Hoon Kim, Seoul (KR); Kisun You, Suwon (KR); Minho Jin, An-yang (KR); Taesu Kim, Seoul (KR); Hyun-Mook Cho, Seoul (KR)

(73) Assignee: QUALCOMM INCORPORATED, San Diego, CA (US)

( * ) Notice: Subject to any disclaimer, the term of this patent is extended or adjusted under 35 U.S.C. 154(b) by 222 days.

(21) Appl. No.: 13/450,016

(22) Filed: Apr. 18, 2012

(65) Prior Publication Data

US 2013/0108115 A1 May 2, 2013

Related U.S. Application Data

(60) Provisional application No. 61/528,741, filed on Aug. 29, 2011.

(51) Int. Cl.
*G06K 9/00* (2006.01)
*G06K 9/20* (2006.01)
(Continued)

(52) U.S. Cl.
CPC .............. *G06K 9/2054* (2013.01); *G06K 9/033* (2013.01); *G06K 9/723* (2013.01); *G06K 9/726* (2013.01)

(58) Field of Classification Search
CPC ..... G06K 9/00; G06K 7/0045; G06K 7/0087; G06K 7/0095; G06K 9/344; G06K 9/348; G06K 2009/00006; G06K 2009/00221; G06K 2009/00442; G06K 2009/00395; G06K 2009/00577; G06K 2009/885; G06K 2209/01

USPC ......... 382/106, 140, 159, 161, 229, 311, 317, 382/321; 348/169, 170, 171, 172; 704/2, 5, 704/9, 10, 235, 258

See application file for complete search history.

(56) References Cited

U.S. PATENT DOCUMENTS 6,577,755 B1 * 6/2003 Lorie ............................ 382/140
7,415,171 B2 * 8/2008 Snapp ........................... 382/311
(Continued)

FOREIGN PATENT DOCUMENTS

JP 2000348142 A 12/2000
JP 2002209262 A 7/2002
(Continued)

OTHER PUBLICATIONS

International Search Report and Written Opinion—PCT/US2012/049786—ISA/EPO—Apr. 29, 2013.
(Continued)

*Primary Examiner* — Abolfazl Tebatabai
(74) *Attorney, Agent, or Firm* — Kilpatrick Townsend & Stockton LLP

(57) ABSTRACT

Embodiments of the invention describe methods and apparatus for performing context-sensitive OCR. A device obtains an image using a camera coupled to the device. The device identifies a portion of the image comprising a graphical object. The device infers a context associated with the image and selects a group of graphical objects based on the context associated with the image. Improved OCR results are generated using the group of graphical objects. Input from various sensors including microphone, GPS, and camera, along with user inputs including voice, touch, and user usage patterns may be used in inferring the user context and selecting dictionaries that are most relevant to the inferred contexts.

72 Claims, 17 Drawing Sheets

(51) Int. Cl.
*G06K 9/03* (2006.01)
*G06K 9/72* (2006.01)
*G06K 7/10* (2006.01)

(56) References Cited

U.S. PATENT DOCUMENTS

| | | |
|---|---|---|
| 7,499,588 B2 * | 3/2009 | Jacobs et al. ............... 382/182 |
| 8,000,956 B2 | 8/2011 | Brun et al. |
| 8,041,555 B2 | 10/2011 | Buccella |
| 8,204,842 B1 * | 6/2012 | Zhang et al. ............... 706/45 |
| 2005/0221856 A1 | 10/2005 | Hirano et al. |
| 2006/0012677 A1 | 1/2006 | Neven, Sr. et al. |
| 2006/0015337 A1 | 1/2006 | Kurzweil et al. |
| 2006/0045340 A1 | 3/2006 | Sakakibara et al. |
| 2007/0257934 A1 | 11/2007 | Doermann et al. |
| 2009/0285492 A1 | 11/2009 | Ramanujapuram et al. |
| 2011/0176720 A1 * | 7/2011 | Van Osten et al. ........... 382/154 |
| 2012/0250943 A1 | 10/2012 | Aomi |

FOREIGN PATENT DOCUMENTS

| | | |
|---|---|---|
| JP | 2003108551 A | 4/2003 |
| JP | 2003178067 A | 6/2003 |
| JP | 2006065477 A | 3/2006 |
| JP | 2009086349 A | 4/2009 |
| JP | 2009258871 A | 11/2009 |
| JP | 2011134144 A | 7/2011 |
| WO | WO-2005066882 A1 | 7/2005 |

OTHER PUBLICATIONS

Ogden P, "Applying intelligent character recognition in the real world", Mar. 25, 1999, Mar. 23, 1999, pp. 11/1-11/4, XP006500652.
Partial International Search Report—PCT/US2012/049786—ISA/EPO—Mar. 19, 2013.

* cited by examiner

CAMERA OCR WITH CONTEXT INFORMATION

CROSS-REFERENCES TO RELATED APPLICATIONS

This application claims priority to U.S. Provisional Application No. 61/528,741 entitled "CAMERA OCR WITH CONTEXT INFORMATION," filed Aug. 29, 2011 and is hereby incorporated by reference.

BACKGROUND OF THE INVENTION

Optical character recognition (OCR) is a mechanical or electronic translation of scanned images of handwritten, typewritten or printed text, graphics or symbols into machine-encoded text. OCR is a growing field of research in computer vision and augmented reality applications. Computer vision allows a device to perceive the environment in its vicinity. Computer vision enables applications in augmented reality by allowing the sensory input from the end-user's interaction with the real world extend into the virtual world. In a real life example application, computer vision-enabled OCR may help visually disabled individuals in perceiving written text and symbols in the field of view of a camera of a personal mobile device such as a smart phone.

Transformation of the analog to digital age has also fueled the application of OCR and improvements in the technology. Most file cabinets and large docketing systems are in transformation to digital searchable media. With all the advances in OCR technology, OCR is still not suitable for mobile devices with limited processing power. Unlimited recognition of characters and symbols from the camera image captured by the mobile device is difficult to process due to the enormous selection of words, characters, and symbols in different languages and different cultures. The computational complexity is also an issue since the OCR needs to run in real time or close to real time on a mobile device to support computer vision and augmented reality applications.

Embodiments of the invention address these and other problems.

SUMMARY

Techniques are provided for performing context-sensitive OCR. The techniques described herein are particularly useful for mobile devices with limited processing power. However, application of the techniques described herein is not limited to mobile devices and may be applicable to all OCR applications. Input from various sensors including microphone, GPS, and camera, along with user input including voice, touch, and user usage patterns are used to infer the user context and select dictionaries that are most relevant to the inferred contexts.

An example of a method for performing OCR includes obtaining an image using a camera coupled to a device, identifying a portion of the image comprising at least one graphical object, inferring a context associated with the image, selecting a group of graphical objects based on the context associated with the image, and improving an OCR result of the at least one graphical object using the group of graphical objects. In some embodiments, improving the OCR result includes performing an OCR using the group of graphical objects. In another embodiment, improving the OCR result includes generating a plurality of OCR candidates for the at least one graphical object by performing an OCR on the at least one graphical object, and selecting an OCR candidate from the plurality of OCR candidates using the group of graphical objects. The method may further include improving the inferred context using the OCR result.

Implementations of such a method may include one or more of the following features. The graphical object may include one or more of symbols, characters, words, signs, and numbers. The group of graphical objects may include a plurality of graphical objects associated with each other through a common characteristic and may represent a dictionary or a refinement of a dictionary. In some aspects of the invention the context of the image is non-textual. In other aspects, the context may be inferred using graphical illustrations, wherein graphical illustrations may be from at least one of a group comprising gestures and graphical representations of an object. The context of the image may also be inferred using sensor input. The sensor input may be provided by one or more of a camera, a microphone, a light sensor, a clock, and a GPS element. The context may also be inferred by estimating a distance between the camera and the at least one graphical object, and inferring the context based on the estimated distance between the camera and the at least one graphical object. Inferring the context may also include detecting at least one characteristic associated with a plurality of light rays in an environment where the image is obtained, and inferring the context based on the at least one characteristic associated with the plurality of light rays. Furthermore, the at least one characteristic associated with the plurality of light rays may be brightness, wherein brightness under a threshold results in an inference of obtaining the image indoors and brightness over a threshold results in the inference of obtaining the image outdoors.

In other implementations, inferring the context may include receiving an audio input using a microphone, performing pattern recognition on the audio input, and inferring the context based on a recognized pattern in the audio input. The recognized pattern may be a voice command from the user or an indication for a location of the camera at the time of receiving the audio input. Inferring the context may also include receiving context-related information from a user, and inferring the context based on the received context-related information from the user. The context may also be inferred based on the location of the device that may include estimating a location of the device, and inferring the context based on the estimated location of the device. The location of the device may be estimated using a GPS element of the device, strength of a signal in relation to a cell tower, or audio input from a microphone.

In some embodiments, content semantics and structural analysis may also be used in analyzing the context associated with the image. For structural layout analysis, the relationship between the graphical objects may be compared with each other or a graphical illustration. A graphical illustration may be a gesture or a graphical representation of an object. For content semantics analysis, the co-occurrence of graphical objects with each other or with graphical illustrations may be analyzed.

Furthermore, the content semantics may be analyzed using graphical objects such as text displayed in multiple languages in the image. In one embodiment, one or more portions of the image comprising a first graphical object in a first language and a second graphical object in a second language are identified, wherein the first graphical object and the second graphical object have a similar meaning. A first plurality of candidates for the first graphical object and a second plurality of candidates for the second graphical object are also identified and the graphical object is selected from the first plurality of candidates that has a similar meaning to at least one of the second plurality of candidates. Furthermore, the graphical object from the first plurality of candidates may include translating the second plurality of candidates for the second graphical object to the first language; and finding at least one graphical object with a meaning from the first plurality of candidates similar to the translated second plurality of candidates.

An example of a device for performing OCR may include a processor, a camera for obtaining images, and a non-transitory computer-readable storage medium coupled to the processor, wherein the non-transitory computer-readable storage medium comprises code executable by the processor for implementing a method that includes obtaining an image using a camera coupled to a device, identifying a portion of the image comprising at least one graphical object, inferring a context associated with the image, selecting a group of graphical objects based on the context associated with the image, and improving an OCR result of the at least one graphical object using the group of graphical objects. Improving the OCR result may include performing an OCR using the group of graphical objects. Improving the OCR result may also include generating a plurality of OCR candidates for the at least one graphical object by performing an OCR on the at least one graphical object, and selecting an OCR candidate from the plurality of OCR candidates using the group of graphical objects. The device may further improve the inferred context using the OCR result. Implementations of such a device may include one or more of the features discussed above in regard to other examples.

An additional example of an embodiment of the invention includes a non-transitory computer-readable storage medium coupled to the processor, wherein the non-transitory computer-readable storage medium comprises code executable by the processor for implementing a method that may include obtaining an image using a camera coupled to a device, identifying a portion of the image comprising at least one graphical object, inferring a context associated with the image, selecting a group of graphical objects based on the context associated with the image, and improving an OCR result of the at least one graphical object using the group of graphical objects. Improving the OCR result includes performing an OCR using the group of graphical objects. Improving the OCR result may also include generating a plurality of OCR candidates for the at least one graphical object by performing an OCR on the at least one graphical object, and selecting an OCR candidate from the plurality of OCR candidates using the group of graphical objects. Implementations of such an apparatus may include one or more of the features discussed above in regard to other examples.

Yet another example of an apparatus for performing a method for OCR may include means for obtaining an image using a camera coupled to a device, means for identifying a portion of the image comprising at least one graphical object, means for inferring a context associated with the image, means for selecting a group of graphical objects based on the context associated with the image, and means for improving an OCR result of the at least one graphical object using the group of graphical objects. Improving the OCR result includes performing an OCR using the group of graphical objects. Improving the OCR result may also include generating a plurality of OCR candidates for the at least one graphical object by performing an OCR on the at least one graphical object, and selecting an OCR candidate from the plurality of OCR candidates using the group of graphical objects. Implementations of such an apparatus may include one or more of the features discussed above in regard to other examples.

The foregoing has outlined rather broadly the features and technical advantages of examples according to the disclosure in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1:
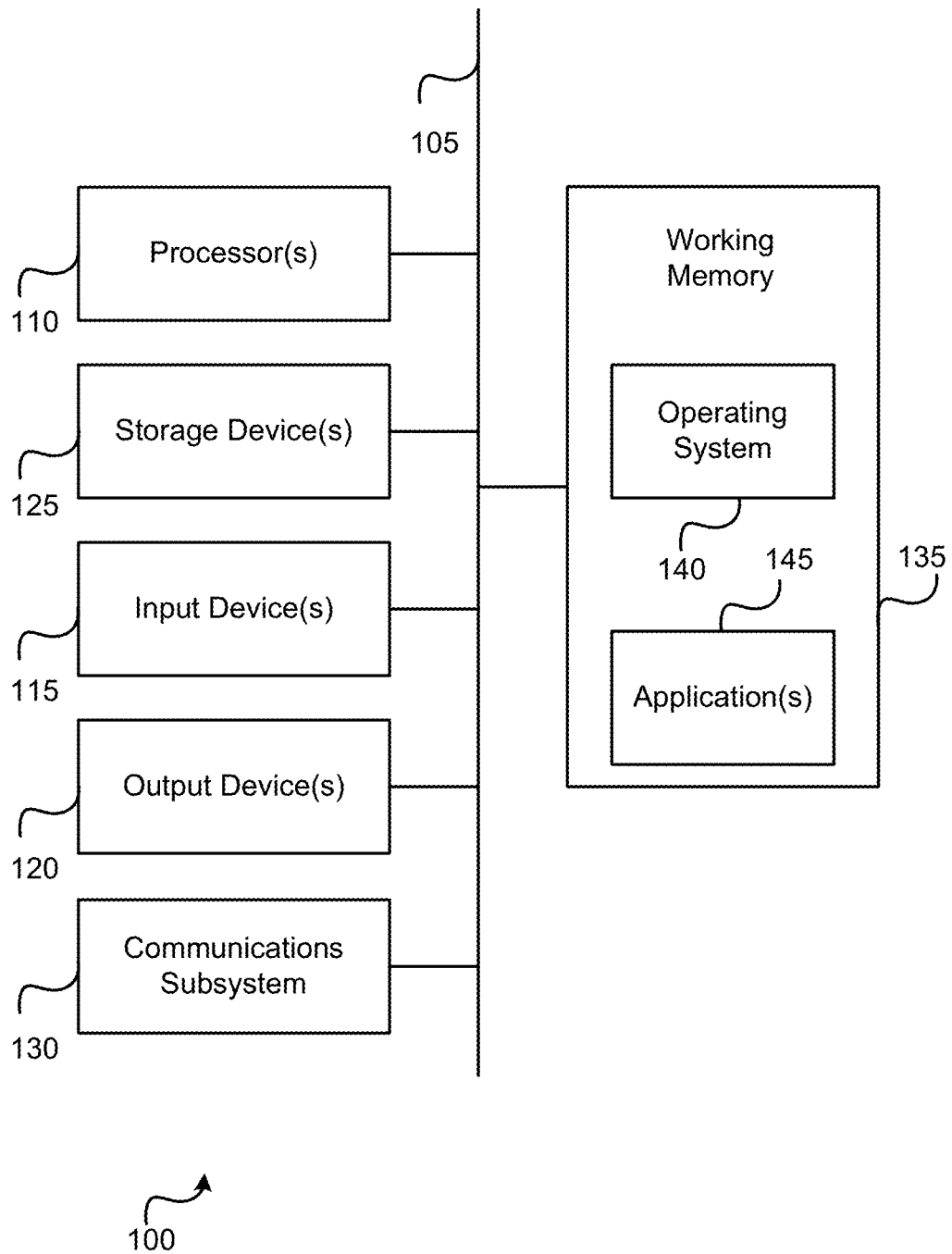
FIG. 1 illustrates an exemplary computer system incorporating parts of the device employed in practicing embodiments of the invention.

A computer system as illustrated in FIG. 1 may be incorporated as part of the previously described computerized device. For example, computer system 1200 can represent some of the components of a mobile device. A mobile device may be any computing device with an input sensory unit like a camera and a display unit. Examples of a mobile device include but are not limited to video game consoles, tablets, smart phones and any other hand-held devices. FIG. 1 provides a schematic illustration of one embodiment of a computer system 100 that can perform the methods provided by various other embodiments, as described herein, and/or can function as the host computer system, a remote kiosk/terminal, a point-of-sale device, a mobile device, a set-top box and/or a computer system. FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115, which can include without limitation a camera, sensors (including inertial sensors), a mouse, a keyboard and/or the like; and one or more output devices 120, which can include without limitation a display unit, a printer and/or the like.

The computer system 100 may further include (and/or be in communication with) one or more non-transitory storage devices 125, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), other computer systems, and/or any other devices described herein. In many embodiments, the computer system 100 will further comprise a non-transitory working memory 135, which can include a RAM or ROM device, as described above.

The computer system 100 also can comprise software elements, shown as being currently located within the working memory 135, including an operating system 140, device drivers, executable libraries, and/or other code, such as one or more application programs 145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 125 described above. In some cases, the storage medium might be incorporated within a computer system, such as computer system 100. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 100) to perform methods in accordance with the disclosure. For example, some or all of the procedures of the described methods may be performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another computer-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 100, various computer-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 125. Volatile media include, without limitation, dynamic memory, such as the working memory 135. Transmission media include, without limitation, coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc. carried by the signals) to the working memory 135, from which the processor(s) 110 retrieves and executes the instructions. The instructions received by the working memory 135 may optionally be stored on a non-transitory storage device 125 either before or after execution by the processor(s) 110.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

As described herein, a graphical object from an image is the target for the OCR and may include but is not limited to one or more symbols, alphanumeric characters, words, signs, numbers, or text. For example, a graphical object in the image may be a word or a sentence in any language. A word may be represented as a symbol in some languages. Similarly, a sentence in one language or culture may be represented simply using a symbol in another language or culture. In another example, a graphical object may be a street sign such as STOP, YIELD, etc. Different graphical objects may be used in different regions, languages or cultures to represent the same meaning. Additionally, graphical illustrations may also be identified from the image. A graphical illustration may include a gesture or a graphical representation of an object such as a text word, symbol, etc. For example, an image of an apple is a graphical illustration of the word "apple." Generally, the graphical illustration aids in improving the OCR results for the graphical objects.

As described herein, a group of graphical objects may comprise a plurality of graphical objects associated with each other through a common characteristic. In one embodiment, the group of graphical objects represents a dictionary. In another embodiment, the group of graphical objects represents a refinement of a dictionary. In yet another embodiment, the group of graphical objects may be an index of objects that are grouped together sharing one or more characteristics. In the methods described herein, some embodiments are described using a dictionary for illustrative purposes; however, the use of dictionary in these embodiments is not restrictive in any way and any group of graphical objects may be utilized.

In one implementation, the grouping for the group of graphical objects may be pre-determined and pre-categorized. For instance, the graphical objects may be pre-categorized into different regions and different languages. In another implementation, the grouping for the group of graphical objects may be performed real-time or close to real-time. The grouping may be organized and implemented using a linked list, array, database or any other suitable means.

Figure 2A:
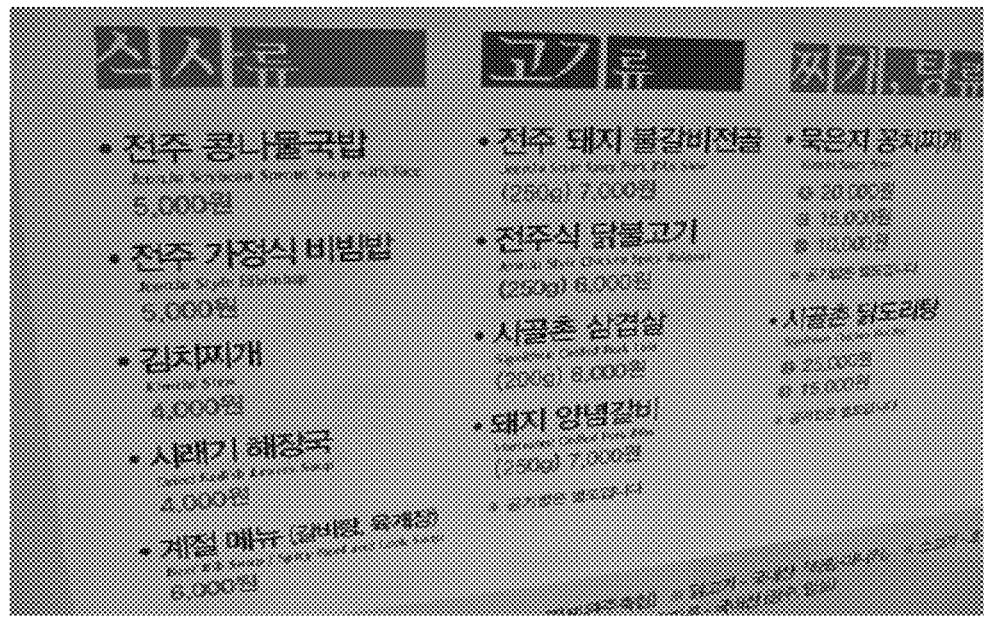
FIG. 2A depicts a diagram showing an exemplary representation of an image captured by the mobile device for context-sensitive OCR.
Figure 2B:
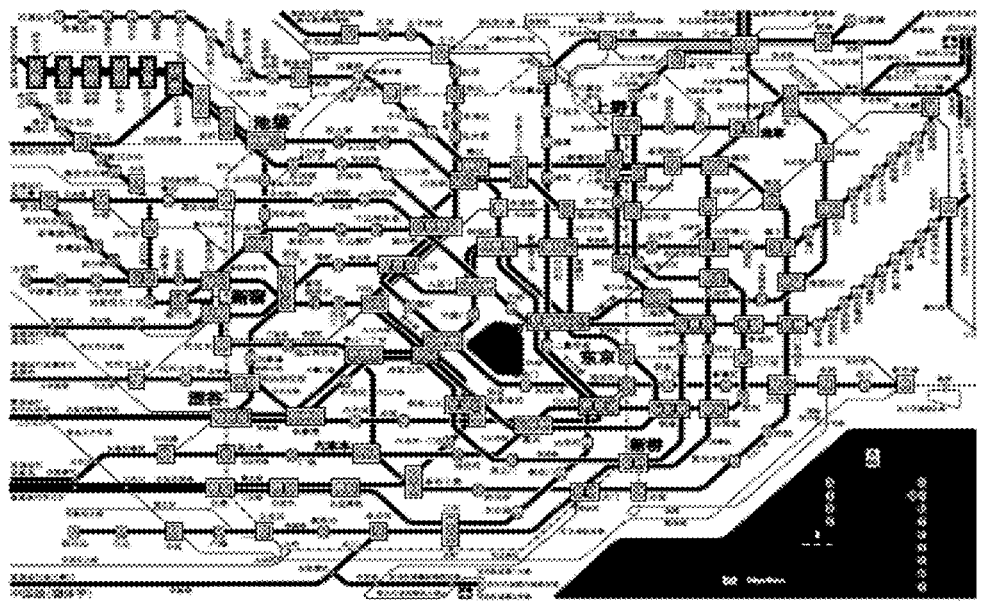
FIG. 2B depicts another diagram showing an exemplary representation of an image captured by the mobile device for context-sensitive OCR.

FIGS. 2A and 2B depict diagrams with exemplary representations of images obtained using a mobile device for context-sensitive OCR. Context-sensitive OCR allows for more accurate and faster OCR results by narrowing the group of graphical objects selected for OCR. In one aspect, the group of graphical objects may be a dictionary of symbols or words. Once OCR is performed, a number of suitable words may be generated or selected using the detected context. The OCR results may be matched against the dictionaries available to find the correct word for the detected context. Context-sensitive OCR can use numerous different embodiments of the invention described herein, singularly or in conjunction with each other, to select the most suitable dictionaries or refinement of dictionaries for OCR.

FIG. 2A is a menu from a Korean restaurant. For instance, the location of the user of the mobile device may be obtained through a GPS element or microphone coupled to the mobile device and can help identify the language and perhaps also the specific restaurant. The structure of the document, the lighting, the focal distance of the text of the menu from the camera lens and the time of the day can all help determine that the user is focusing on a dinner menu. This allows the mobile device to select a dictionary as narrow as possible or further refine a dictionary. Matching the context information increases the accuracy and speed of the OCR, and can also potentially reduce the processing power needed for OCR. Furthermore, in FIG. 2A, the menu items are also described in English in a smaller font. Aspects on the invention may also perform OCR on the English portions of the image, translate the English OCR results to Korean and compare the potential candidates from the Korean OCR and the English OCR to select the best match for the Korean OCR.

Similarly, FIG. 2B is an image of a Japanese transit system. The location, language, lighting, structure of the document, environment, noise conditions and many other similar input can help determine the context and speed up the OCR procedures for recognizing the text and signs in the image for the user.

Figure 3:
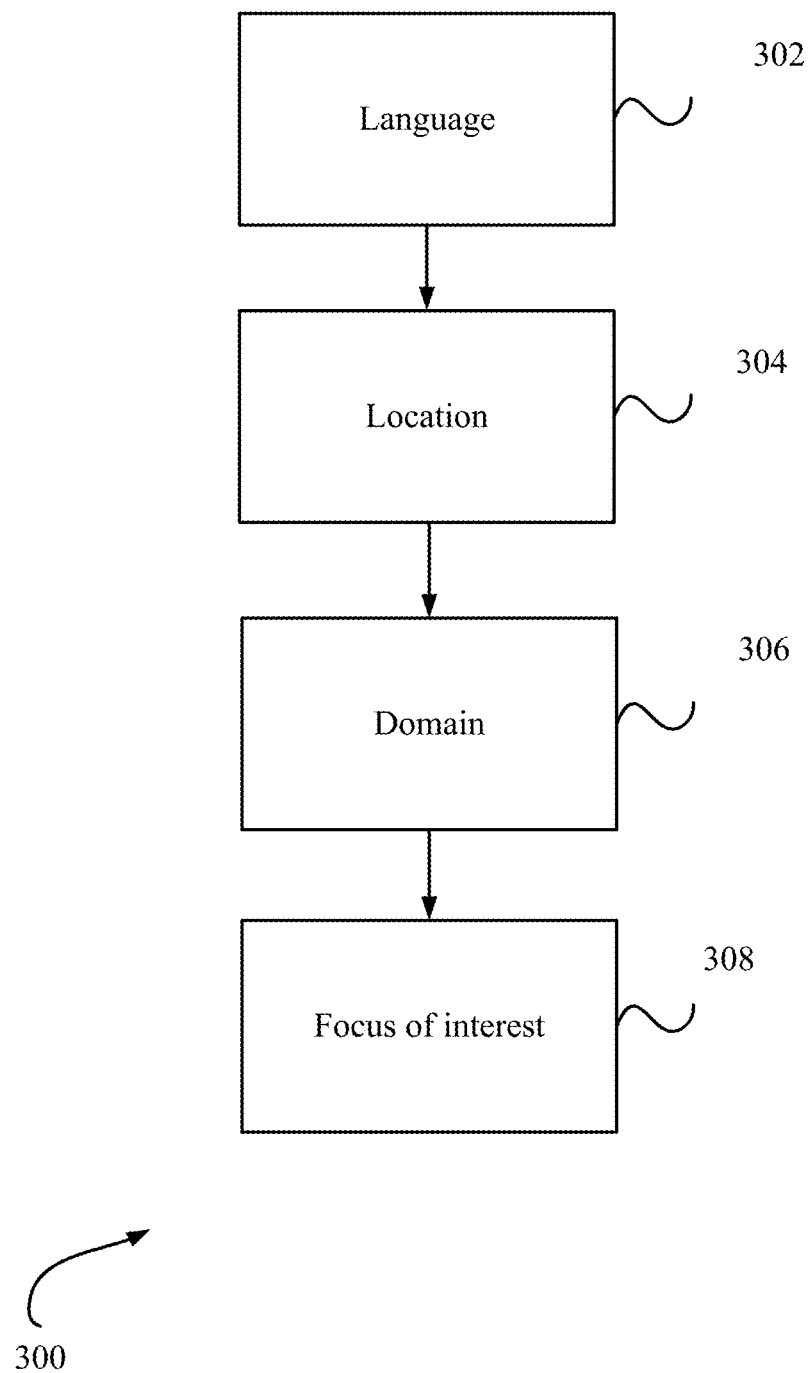
FIG. 3 illustrates a flow diagram, showing a non-limiting exemplary decision tree using contextual information for selecting groups of graphical objects for OCR.

FIG. 3 is a flow diagram illustrating a non-limiting exemplary decision tree using contextual information for selecting a group of graphical objects for OCR. A group of graphical objects may be a dictionary, or a refinement of a dictionary. In the embodiment described with respect to FIG. 3, the dictionaries are narrowed from the widest criteria to the narrowest or most focused criteria. In other embodiments, only one source or sensory input may be used in arriving at the selection of the context and the associated dictionaries. Yet, in other embodiments, the sequence of decisions taken in narrowing the selection of the dictionaries may differ in order. The method 300 is performed by processing logic that comprises hardware (circuitry, dedicated logic, etc.), software (such as is run on a general purpose computing system or a dedicated machine), firmware (embedded software), or any combination thereof. In one embodiment, the method 300 is performed by device 100 of FIG. 1.

Referring to FIG. 3, at block 302, the mobile device may determine the language based on a variety of sensor inputs, such as the audio input from the microphone, the geographic location or recognizing a few graphical objects from the image. Determining the language allows the OCR to significantly narrow the search space for the correct word for generating the OCR results.

At block 304, the mobile device can determine the location based on the input from the location identifier. The location may be derived using input from the GPS element on the mobile device, the signal strength in relation to the cell phone tower, the microphone input or manual selection by the user. The location information may be provided and used at different granularities. For instance, the location can help determine if a person is in the city or outskirts. The location information may also be as specific as the restaurant or street name. As an example, if the mobile device determines that the location is a street, the dictionary or refined dictionary containing all the street names of that particular city may be used for faster OCR.

At block 306, the domain for the group of graphical objects is selected. Domain may be a sub-categorization of a context. For instance, one location may have multiple domains. At block 304, if the location is a street, then the domain may be street signs. Similarly, if the location is a restaurant, the domain can be a credit card or a dinner menu. A number of techniques like document structure analysis and content semantic analysis, described in more detail later, may also be used for determining the domain.

At block 308, the search may be further narrowed by discovering the focus of interest in the domain. For instance, the focus of interest on the credit card may be the person's name or the credit card number. The user may give a voice command to select a focus of interest or may touch the text in the image to select the focus of interest.

In various embodiments of the invention, different context sources may be used, singularly or in conjunction with each other, to determine the context and select the most suitable group of graphical objects for OCR. Few examples of context sources may include location, user, clock, camera, and user patterns. Each context source may be further associated with sensor input devices. For instance, the location may be determined using a GPS element present in the mobile device, the signal strength relative to the cell phone tower or through audio input. User can also provide the context source by manually selecting a context or dictionary from a menu displayed on the mobile device or through a vocal command to the device. Furthermore, user behavioral patterns may be used to construct a context originating from the user. Similarly, the clock and date may provide important information regarding night or day environment or the season. A camera is a significant source of context as well, since the camera can provide context for the distance, character size, light conditions, etc. In addition to the camera, the mobile device may also have light sensors to better gauge the light conditions.

It should be appreciated that the specific steps illustrated in FIG. 3 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 300.

Figure 4:
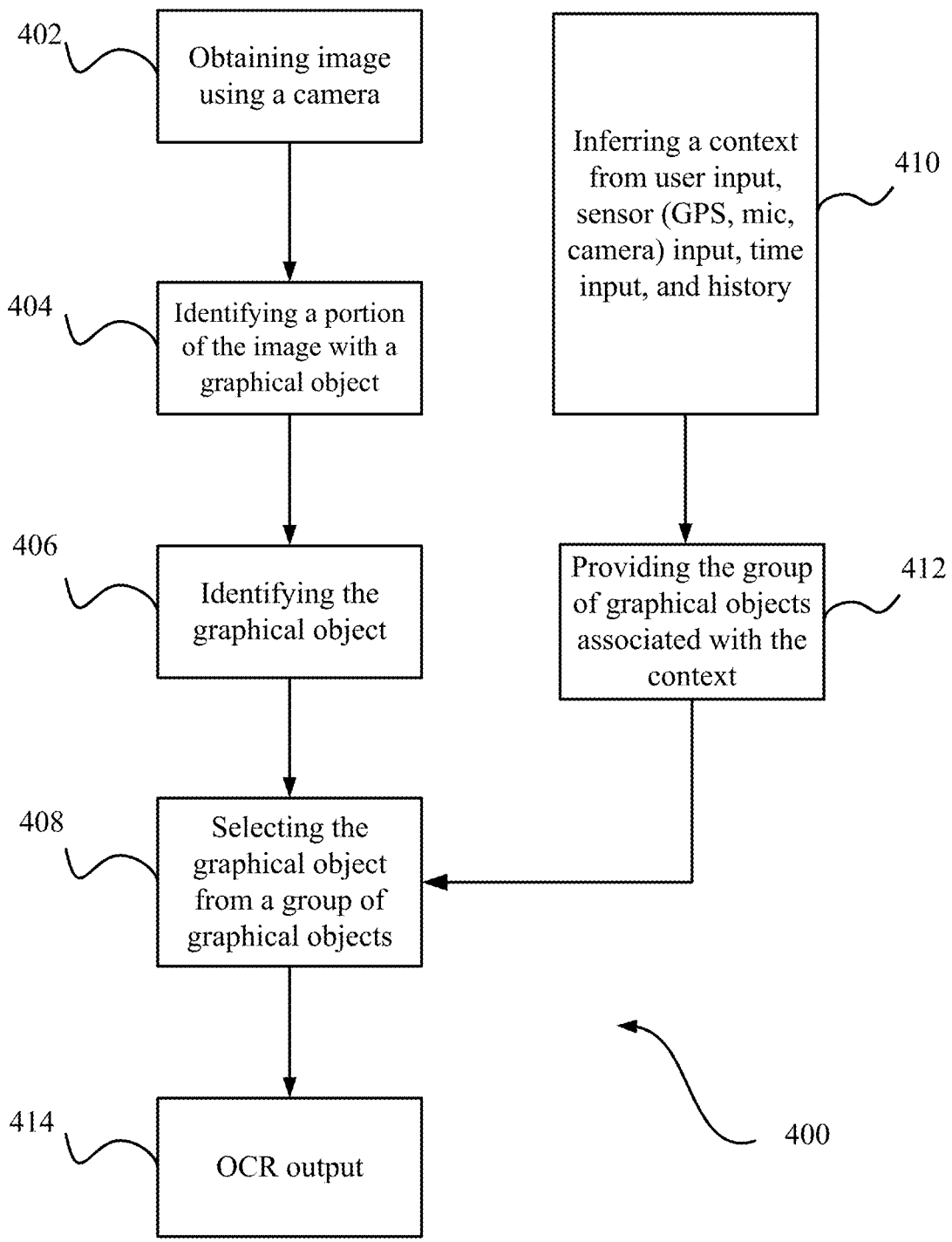
FIG. 4 illustrates a flow diagram, describing an exemplary embodiment for context-sensitive OCR.

FIG. 4 is a flow diagram, describing an exemplary embodiment for performing a method for context-sensitive OCR. The method 400 is performed by processing logic that comprises hardware (circuitry, dedicated logic, etc.), software (such as is run on a general purpose computing system or a dedicated machine), firmware (embedded software), or any combination thereof. In one embodiment, the method 400 is performed by device 100 of FIG. 1.

Referring to FIG. 4, an image is obtained at block 402. In one embodiment, the image is obtained using a camera coupled to a mobile device. Once the image is obtained, at block 404, a portion of the image comprising a graphical object is identified. A graphical object in an image may include but is not limited to one or more symbols, alphanumeric characters, words, signs, or numbers. In one implementation, a rectangular text box is placed around a graphical object. At block 406, the graphical objects are partially or fully recognized. In one aspect, OCR is utilized to recognize the graphical objects. At block 408, a group of graphical objects (such as one or more dictionaries) is identified. In one aspect, the group of graphical objects may be a dictionary or refinement of a dictionary and are generated based on the context of the image.

In one embodiment, the dictionary based on the context of the image is selected in parallel to the processing of the image, so that the context and the group of graphical objects are ready or closer to being ready before the results from the OCR are ready to query the group of graphical objects. At block 410, the context selector may determine context based on input from different sensors and possible user input. The context may be based on the location, camera input, time input, and history among other factors. At block 412, once the proper contexts are selected, the appropriate dictionaries or refinement of dictionaries may be associated with the chosen contexts and passed on to block 408. At block 408, a search is performed using the dictionary or refinement of the dictionary selected based on the context of the image. At block 414, the OCR results are outputted.

In another embodiment, the distance of the text from the camera lens and the physical character size may be used in determining the context of the text. Knowledge of the distance of the signs from the mobile device enables perspective that can be used for narrowing the group of graphical object choices. For instance, signs on the street are far away. A menu in the restaurant is in close range. Text from a book is probably even closer. For such an implementation of the embodiment, the exact distance of the text from the camera may not be required. Instead, the distance can be divided into broader categories such as close, room-size and far. In another exemplary categorization, the distance may be approximated into separate categories such as close-up, normal and infinity from the focal length when the camera is auto-focused. Furthermore, the grouping of the number of words can also help generate hints of the subject matter. For example, a street sign may have about 2-4 words. In contrast, a text-book may have larger groupings of 20-30 words. The projected text size can help constrain the text block size the OCR may need to consider.

It should be appreciated that the specific steps illustrated in FIG. 4 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 400.

Figure 5:
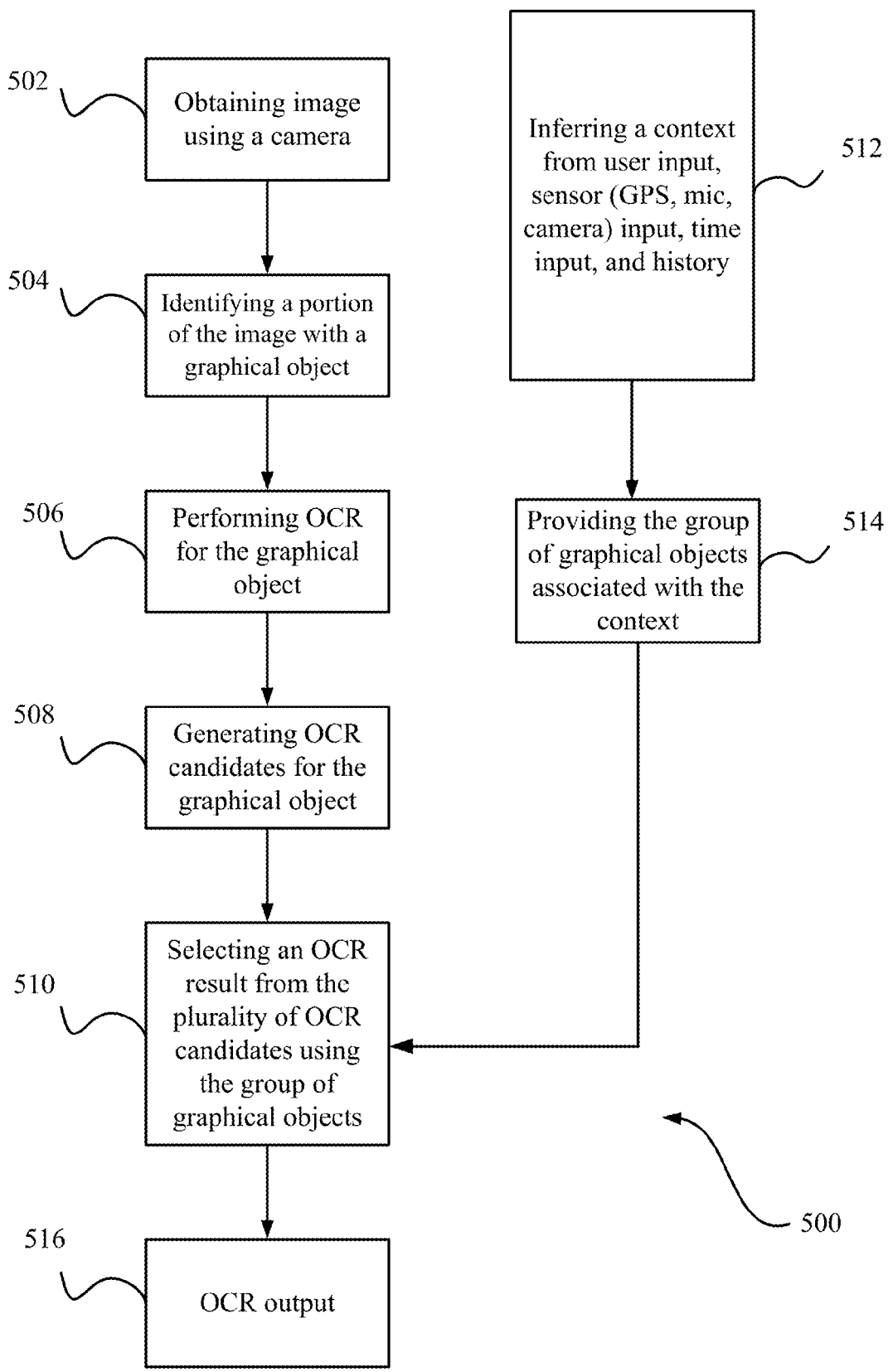
FIG. 5 is a flow diagram, describing yet another exemplary embodiment for performing a method for context-sensitive OCR.

FIG. 5 is a flow diagram, describing yet another exemplary embodiment for performing a method for context-sensitive OCR. The method 500 is performed by processing logic that comprises hardware (circuitry, dedicated logic, etc.), software (such as is run on a general purpose computing system or a dedicated machine), firmware (embedded software), or any combination thereof. In one embodiment, the method 500 is performed by device 100 of FIG. 1.

Referring to FIG. 5, an image is obtained at block 502. In one embodiment, the image is obtained using a camera coupled to a mobile device. Once the image is obtained, at block 504, a portion of the image comprising a graphical object is identified. A graphical object in an image may include but is not limited to one or more symbols, alphanumeric characters, words, signs, or numbers. In one implementation, a rectangular text box is placed around the graphical object. At block 506, the graphical objects are partially or fully recognized. In one aspect, OCR is utilized to recognize the graphical objects. At block 508, one or more OCR candidates are generated from performing OCR on the graphical object. At block 510, an OCR candidate is selected from the plurality of OCR candidates using the group of graphical objects. For instance, performing the OCR may generate 10 OCR candidates. In parallel, the device may also construct a context and select a group of graphical objects (such as one or more dictionaries) based on the context. In one embodiment, the best candidate or the candidate that matches one of the graphical objects from the group of graphical objects may be considered as the OCR result.

In one embodiment, the dictionary based on the context of the image is selected in parallel to the processing of the image, so that the context and the group of graphical objects are ready or closer to being ready before the results from the OCR are ready to query the group of graphical objects. At block 512, the context selector may determine context based on input from different sensors and possible user input. The context may be based on the location, camera input, time input, and history among other factors. At block 514, once the proper contexts are selected, the appropriate dictionaries or refinement of dictionaries may be associated with the chosen contexts and passed on to block 510. At block 510, as described above the best candidate is selected using the group of graphical objects. At block 516, the OCR results are outputted.

It should be appreciated that the specific steps illustrated in FIG. 5 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 500.

Figure 6:
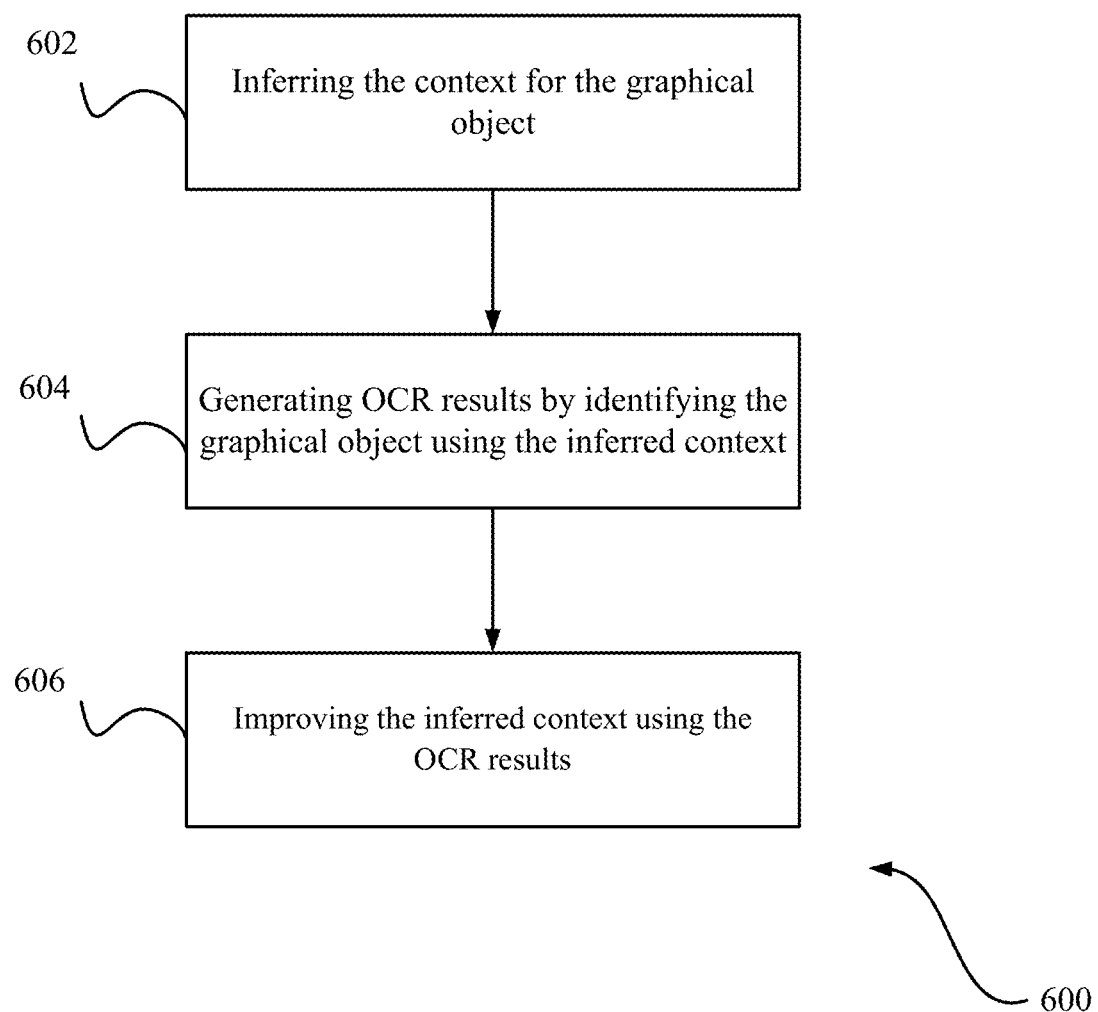
FIG. 6 is a flow diagram, describing an exemplary embodiment for performing a method for context-sensitive OCR.

FIG. 6 is a flow diagram, describing an exemplary embodiment for performing a method for context-sensitive OCR. The method 600 is performed by processing logic that comprises hardware (circuitry, dedicated logic, etc.), software (such as is run on a general purpose computing system or a dedicated machine), firmware (embedded software), or any combination thereof. In one embodiment, the method 600 is performed by device 100 of FIG. 1.

Referring to FIG. 6, at block 602, the context for the graphical object may be inferred using mechanisms described herein. Once the OCR context is inferred, the OCR results may be improved using the inferred context, at block 604. Moreover, at block 606, the inferred context may be further improved by using the OCR results.

It should be appreciated that the specific steps illustrated in FIG. 6 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 600.

Figure 7:
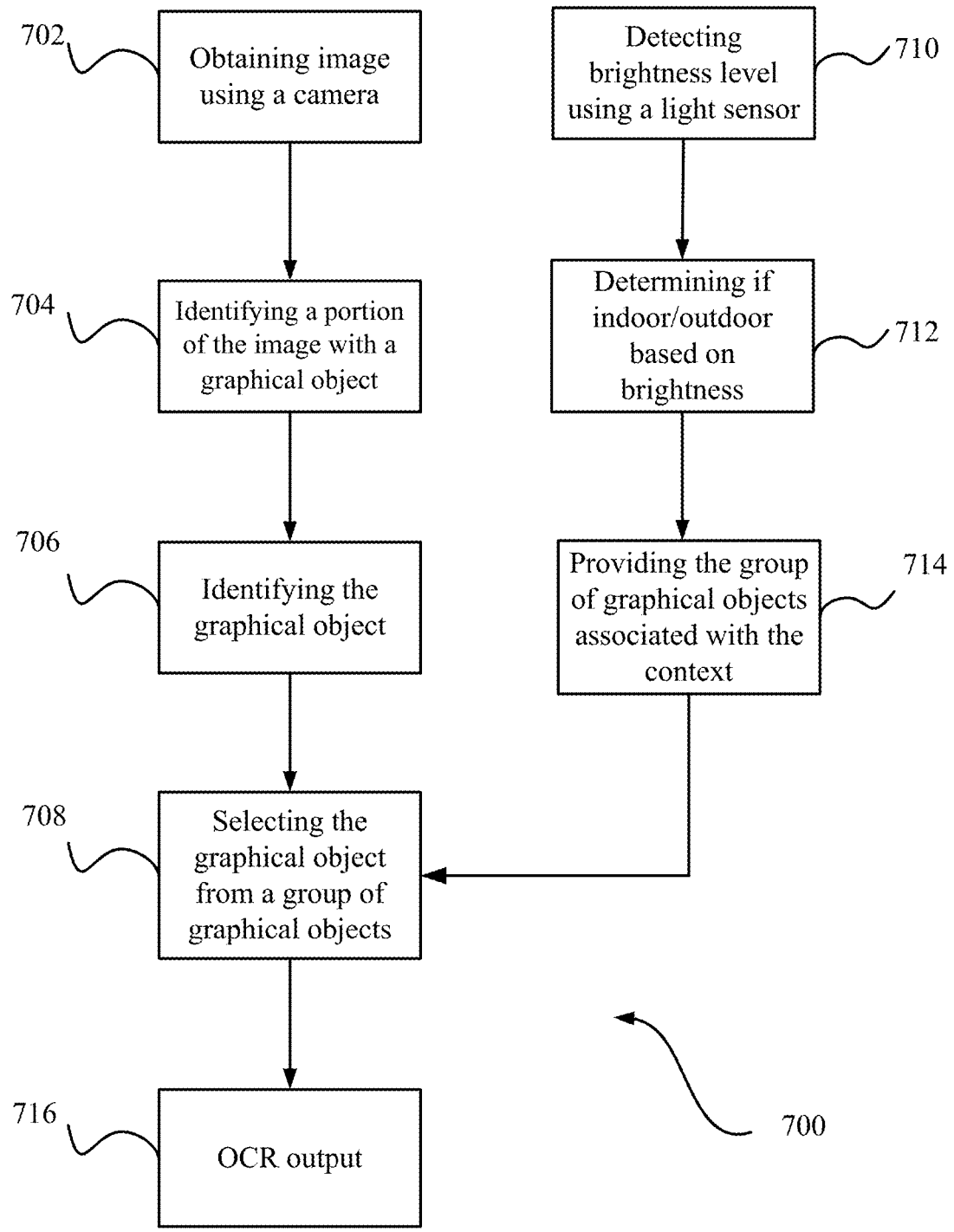
FIG. 7 is a flow diagram, describing another exemplary embodiment for context-sensitive OCR using light conditions.

FIG. 7 is a flow diagram, illustrating an embodiment of the invention for selecting the context for OCR based on the light conditions when the image is obtained. The method 700 is performed by processing logic that comprises hardware (circuitry, dedicated logic, etc.), software (such as is run on a general purpose computing system or a dedicated machine), firmware (embedded software), or any combination thereof. In one embodiment, the method 700 is performed by device 100 of FIG. 1.

Referring to FIG. 7, in one embodiment, selecting the context for the dictionary for OCR is based on the light conditions when the image was obtained. A dictionary is an example of a group of graphical objects that is used for illustrative purposes while describing FIG. 7. An image is obtained at block 702. In one embodiment, the image is obtained using a camera coupled to a mobile device. Once the image is obtained, at block 704, a portion of the image comprising a graphical object (such as a word) is identified. A graphical object in an image may include but is not limited to one or more symbols, alphanumeric characters, words, signs, or numbers. In one implementation, a rectangular text box is placed around a graphical object. At block 706, the graphical objects are partially or fully recognized. In one aspect OCR is utilized to recognize the graphical objects. At block 708, a group of graphical objects is identified. In one aspect, a group of graphical objects may be a dictionary or refinement of a dictionary and generated based on the context of the image.

At block 710, the mobile device receives input from the light sensors. In one implementation, photocells may be used as light sensors. Based on the input from the light sensors the mobile device may determine if the picture was taken outdoors or indoors. For instance, the brightness associated with the plurality of light rays may be determined using the output of the light sensors. In one embodiment, if the brightness under a threshold results in an inference of obtaining the image indoors and brightness over the threshold results in the inference of obtaining the image outdoors. Brightness of the light rays may refer to the luminance, color temperature or both. Furthermore, in some embodiments, to increase the quality of the decision, the mobile device may also detect the properties of sunlight that are distinct from merely a very well lit indoors environment. For instance, a room could be well-lit using fluorescent lights. At block 712, the mobile device determines if the image is being captured indoors or outside. The selection of dictionaries is significantly narrowed by knowing where the image is captured. For instance, OCR for an image obtained indoors would target dictionaries or refinement of dictionaries that would generally have smaller print like restaurant menus or books. On the other hand, OCR for outdoor capture of images would target dictionaries that would generally have larger print and are found outside like street names and shop signs. At block 714, the dictionaries are selected and provided to block 708. At block 708, the appropriate words are selected from the selected dictionaries. At block 716, the OCR results are outputted.

It should be appreciated that the specific steps illustrated in FIG. 7 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 700.

Figure 8:
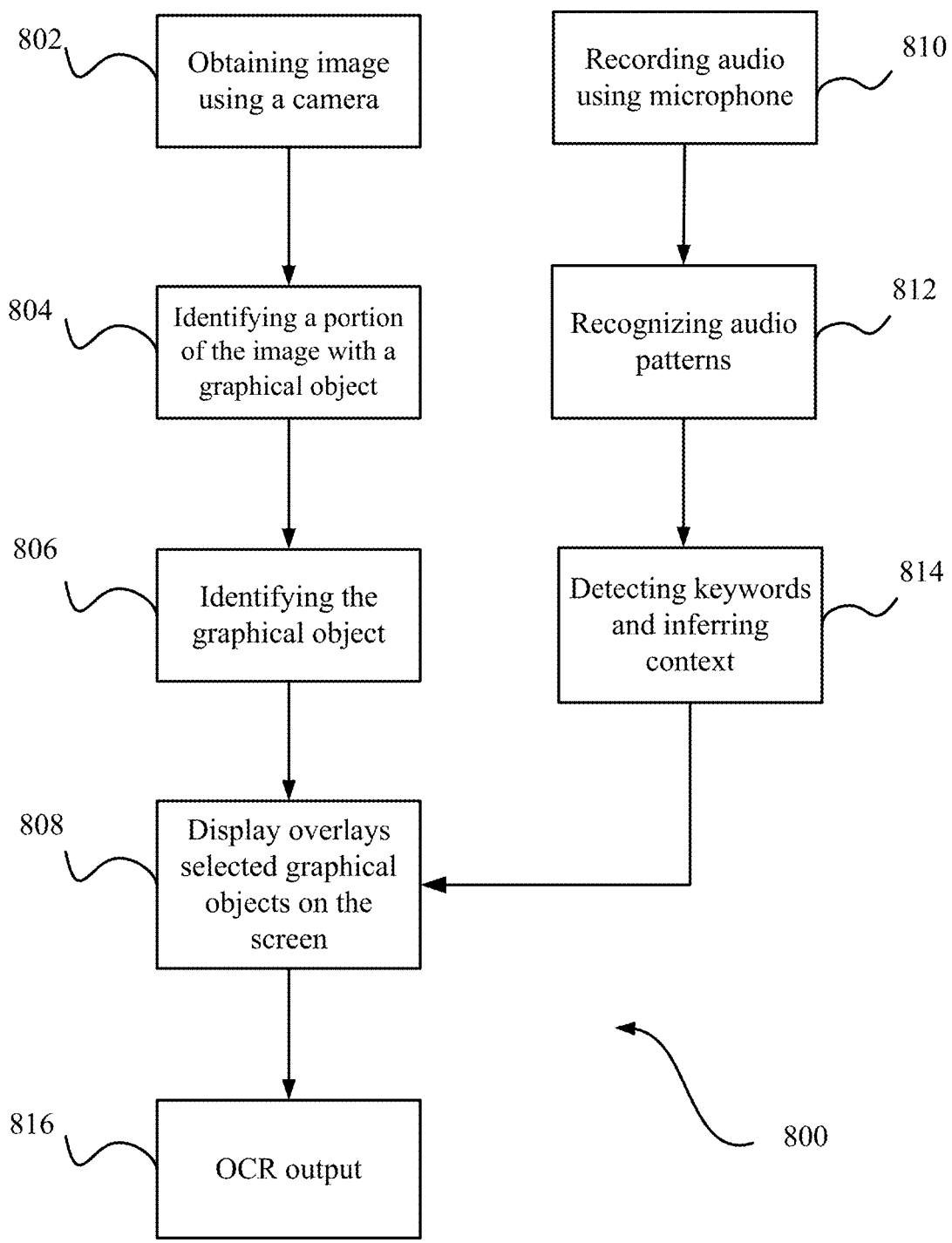
FIG. 8 is a flow diagram, showcasing an exemplary embodiment, where the context for selecting a group of graphical objects for OCR is based on input from a microphone.

FIG. 8 is a flow diagram, showcasing one embodiment, where the context for selecting the dictionary for the OCR is based on input from the microphone. The method 800 is performed by processing logic that comprises hardware (circuitry, dedicated logic, etc.), software (such as is run on a general purpose computing system or a dedicated machine), firmware (embedded software), or any combination thereof. In one embodiment, the method 800 is performed by device 100 of FIG. 1.

Referring to FIG. 8, an image is obtained at block 802. In one embodiment, the image is obtained using a camera coupled to a mobile device. Once the image is obtained, at block 804, a portion of the image comprising a graphical object is identified. A graphical object in an image may include but is not limited to one or more symbols, alphanumeric characters, words, signs, or numbers. In one implementation, a rectangular text box is placed around a graphical object. At block 806, the graphical objects are partially or fully recognized. In one aspect, OCR is utilized to recognize the graphical objects.

At block 810, the microphone receives audio input through the microphone and records the audio. At block 812, the mobile device performs speech recognition on the audio recording. In some embodiments, the user may be able to verbally select the context of the image captured in block 802. For instance, the user can specify the language that the dictionaries should be selected from. In other embodiments, the user can also verbally select the specific fields that the user is interested in from the image. For instance, the user may select proper names or digits visible in the image, or the user may give a more specific verbal command to select a credit card number or cost of an item for OCR processing. At block 814, in one embodiment, keywords may be detected from the recognized audio patterns. In another embodiment, the context is inferred based on the recognized audio patterns. At block 808, the detected keywords and the inferred context, from block 814, may be further used in improving the OCR results. In one embodiment, at block 808, the display overlays the selected words by the user on the screen. At block 816, the OCR results may be outputted.

It should be appreciated that the specific steps illustrated in FIG. 8 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 8 may include multiple sub-steps that may be performed in various sequences as appropriate to the individual step.

Furthermore, additional steps may be added or removed depending on the particular applications. One of ordinary skill in the art would recognize and appreciate many variations, modifications, and alternatives of the method 800.

Figure 9:
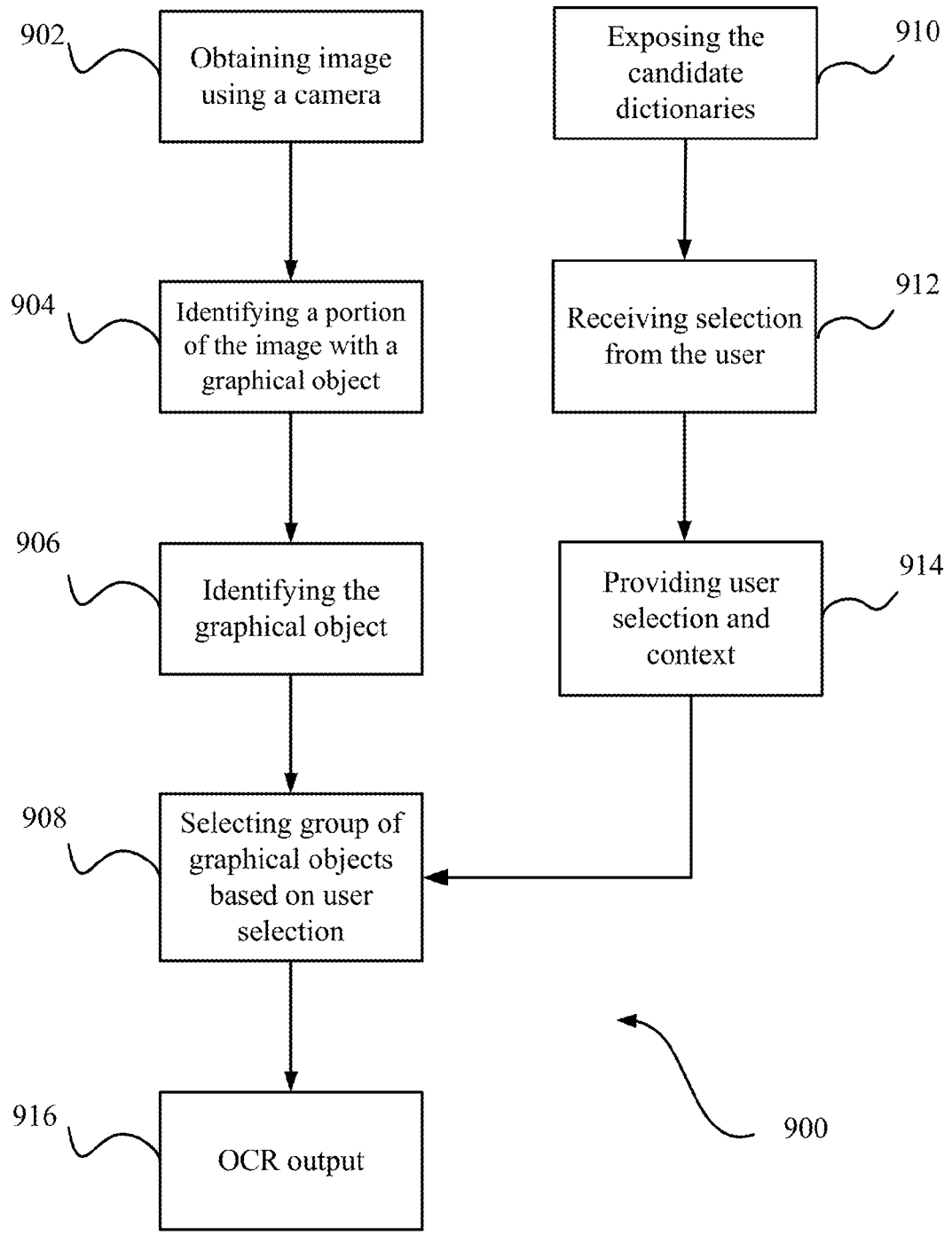
FIG. 9 is a flow diagram, describing an embodiment for using manual input for context-sensitive OCR.

FIG. 9 is a flow diagram, describing an embodiment for using manual input for context-sensitive OCR. The method 900 is performed by processing logic that comprises hardware (circuitry, dedicated logic, etc.), software (such as is run on a general purpose computing system or a dedicated machine), firmware (embedded software), or any combination thereof. In one embodiment, the method 900 is performed by device 100 of FIG. 1.

Referring to FIG. 9, an image is obtained at block 902. In one embodiment, the image is obtained using a camera coupled to a mobile device. Once the image is obtained, at block 904, a portion of the image comprising a graphical object is identified. A graphical object in an image may include but is not limited to one or more symbols, alphanumeric characters, words, signs, or numbers. In one implementation, a rectangular text box is placed around a graphical object. At block 906, the graphical objects are partially or fully recognized. In one aspect, OCR is utilized to recognize the graphical objects.

The embodiment in FIG. 9 may be used in conjunction with other embodiments discussed herein. In one embodiment, different dictionaries may be selected using different contextual sources and presented to the user for final selection. In yet another embodiment, the user may select the dictionary to be used in the context manually by the user through a user interface provided by the mobile device. At block 910, the candidate dictionaries from various sources are selected and presented to the user for the final selection. At block 912, the user selects the dictionary. At block 914, feedback from users' input is accounted for in selecting the dictionary. In some embodiments, the user may select the context for the dictionary rather than the dictionary itself. In other embodiments, the user may choose a grouping or category of dictionaries. At block 908, the graphical objects are recognized based on the user selection and the final results of the OCR are outputted (block 916).

It should be appreciated that the specific steps illustrated in FIG. 9 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 900.

Figure 10:
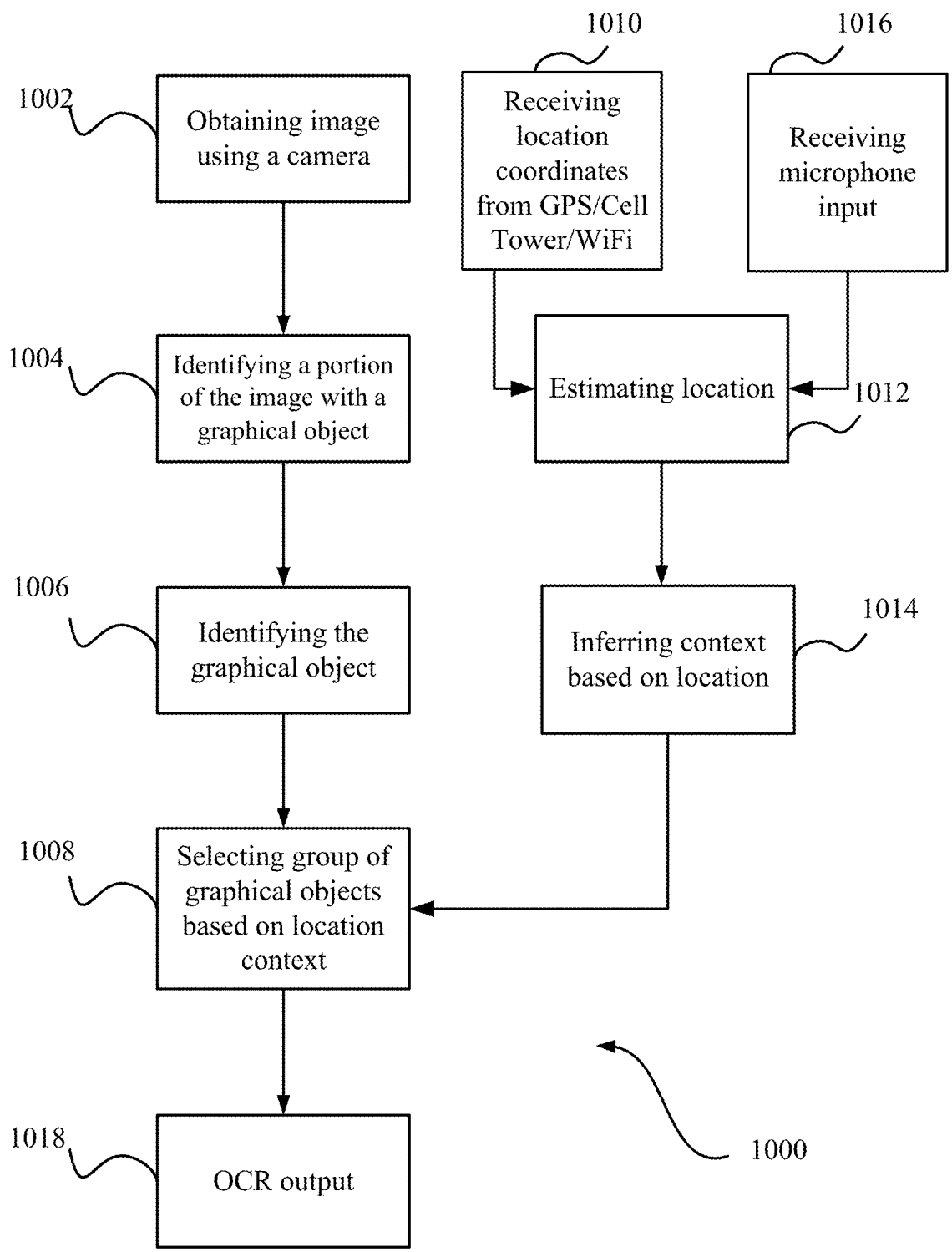
FIG. 10 is a flow diagram discussing another embodiment for performing a method for conducting context-sensitive OCR using the location of where the image is captured.

FIG. 10 is a flow diagram discussing another embodiment for a method for conducting context-sensitive OCR using the location of where the image is obtained. For instance, if the user is inside a specific restaurant, the dictionary selected can be specific to that restaurant. The method 1000 is performed by processing logic that comprises hardware (circuitry, dedicated logic, etc.), software (such as is run on a general purpose computing system or a dedicated machine), firmware (embedded software), or any combination thereof. In one embodiment, the method 1000 is performed by device 100 of FIG. 1.

Referring to FIG. 10, an image is obtained at block 1002. In one embodiment, the image is obtained using a camera coupled to a mobile device. Once the image is obtained, at block 1004, a portion of the image comprising a graphical object is identified. A graphical object in an image may include but is not limited to one or more symbols, alphanumeric characters, words, signs, or numbers. In one implementation, a rectangular text box is placed around a graphical object. At block 1006, the graphical objects are partially or fully recognized. In one aspect, OCR is utilized to recognize the graphical objects.

At block 1010, location for the data is obtained. In one embodiment, the location of the person capturing the image can be ascertained using a GPS element in the mobile device. Alternatively, user location may be determined using the strength of the signal in relation to the cell tower or through a wireless access point connection like WiFi or any other suitable means. At block 1012, the mobile device processes the location data to determine the specifics for a location. The granularity of the location may also determine the granularity of the dictionaries selected. At block 1014, the dictionary based on the location is selected. If the location selected in block 1012 is a country or a specific region of a country, then the appropriate language dictionary for that region may be selected at block 1014. For example, for a user in Korea, Korean language may be selected With the increase in granularity of the location ascertained at block 1012, further refined dictionaries may be selected at block 1014. In another embodiment, the mobile device may access the network to acquire more information with respect to a certain location. For instance, in one embodiment, once the GPS coordinates of the mobile device are obtained, the mobile device may query a database located locally or remotely to ascertain the details associated with a location. In one example, at block 1012, the GPS coordinates for a specific location are associated with a Greek restaurant. At block 1014, the dictionary selected for OCR may be specific for that restaurant. If a dictionary specific to that restaurant is not available, a more general dictionary relevant to Greek food may be selected. At block 1008, the identified graphical object is selected from a group of graphical objects based on the location context from block 1014. At block 1018, the selected OCR graphical object may be outputted.

The microphone sensors, at block 1016, may also provide location information at block 1012 for determining the specific location. In one example, a restaurant may have a signature tone that is associated with that location. The mobile device records and analyzes the tone and determines the location associated with the tone either locally on the mobile device or on a remote server. Related patent application "Mobile device location estimation using environmental information," patent application Ser. No. 12/898,647, describes this embodiment for determining the restaurant in greater detail.

It should be appreciated that the specific steps illustrated in FIG. 10 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1000.

Figure 11:
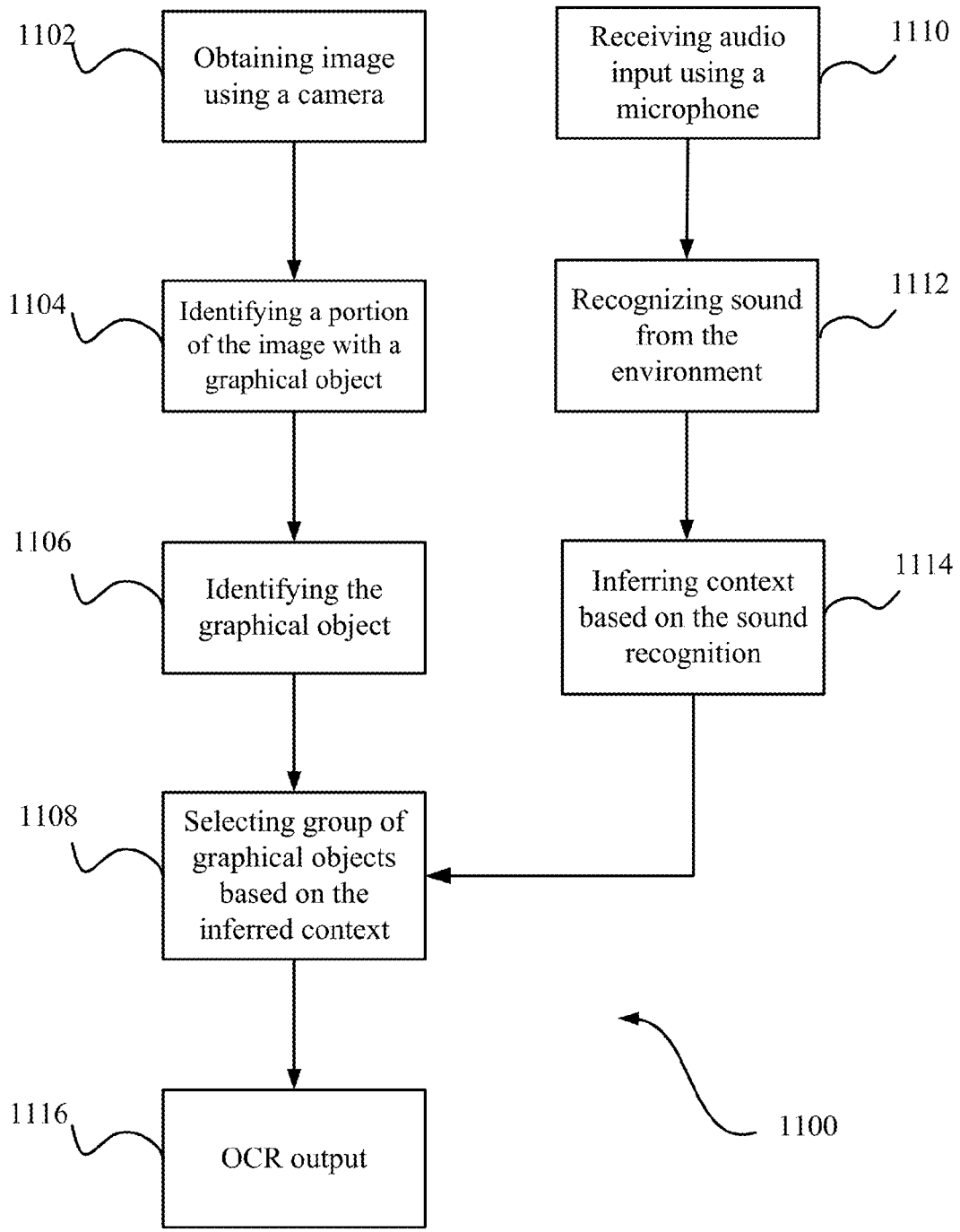
FIG. 11 is a flow diagram, describing another exemplary embodiment of recognizing the environment using a microphone to select a dictionary for context-sensitive OCR.

FIG. 11 is a flow diagram, describing another exemplary embodiment for recognizing the environment using a microphone to select a group of graphical objects for context-sensitive OCR. A dictionary is an example of a group of graphical objects that is used for illustrative purposes while describing FIG. 11. The method 1100 is performed by processing logic that comprises hardware (circuitry, dedicated logic, etc.), software (such as is run on a general purpose computing system or a dedicated machine), firmware (embedded software), or any combination thereof. In one embodiment, the method 1100 is performed by device 100 of FIG. 1.

Referring to FIG. 11, an image is obtained at block 1102. In one embodiment, the image is obtained using a camera coupled to a mobile device. Once the image is obtained, at block 1104, a portion of the image comprising a graphical object is identified. A graphical object in an image may include but is not limited to one or more symbols, alphanumeric characters, words, signs, or numbers. In one implementation, a rectangular text box is placed around a graphical object. At block 1106, the graphical objects are partially or fully recognized. In one aspect, OCR is utilized to recognize the graphical objects.

At block 1110, the microphone receives input from the surroundings. At block 1112, the audio input received from block 1110 is analyzed. The environment of the user is recognized based on the audio input. For instance, at block 1112, the mobile device may determine that the environment is a restaurant, street or office. At block 1114, the mobile device may select the appropriate dictionary based on the environment detected using the audio input from the microphone and provide the dictionary to block 1108. At block 1108, the appropriate graphical object is selected from the dictionary based on the inferred context and outputted at block 1116. Related provisional patent application, "Recognizing environmental sound on local device and server," Pat. Application No. 61/449,475, describes this embodiment for detecting the environmental factors in greater detail.

It should be appreciated that the specific steps illustrated in FIG. 11 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1100.

Figure 12:
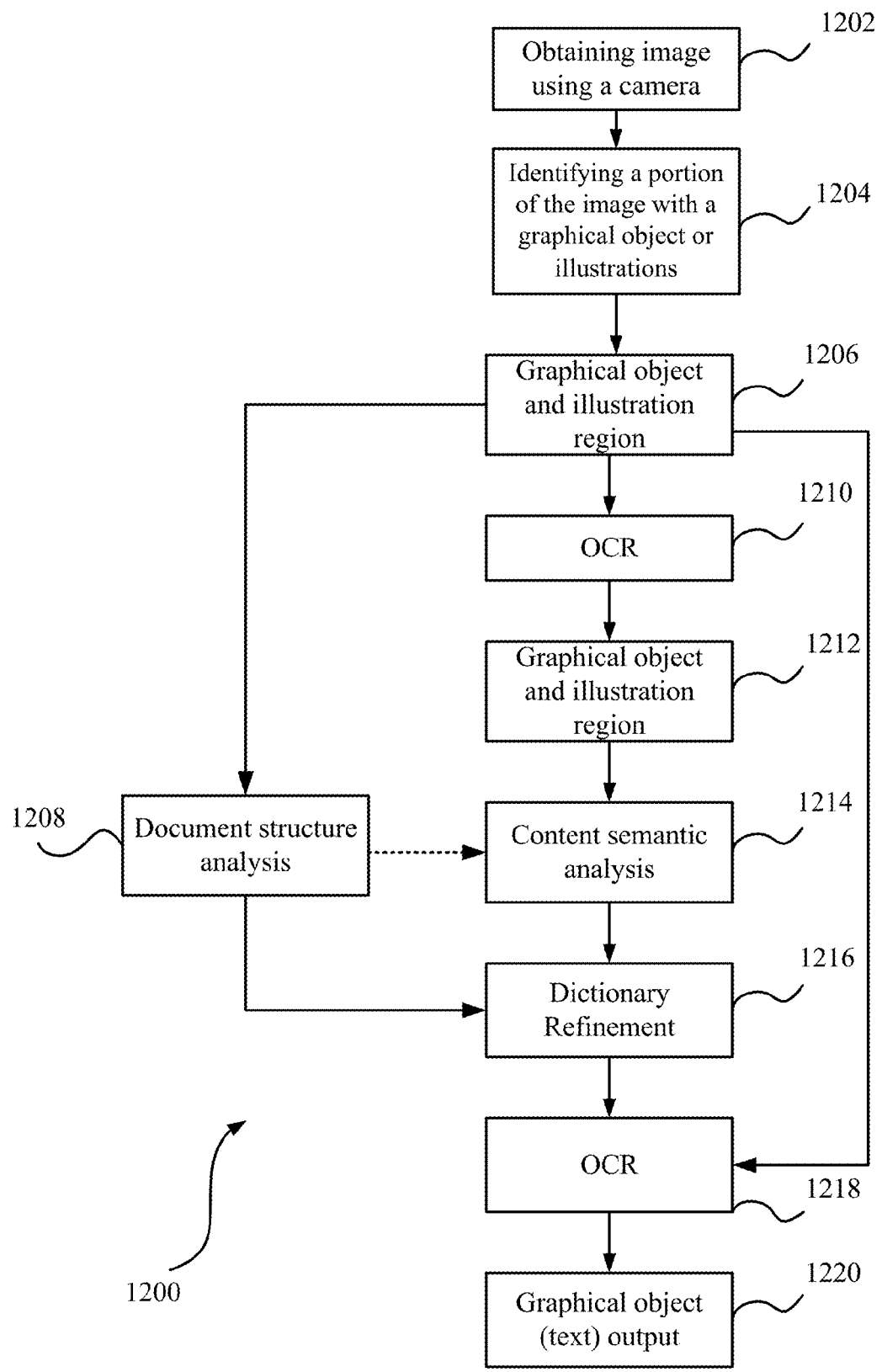
FIG. 12 is a flow diagram describing an embodiment for context identification using content analysis.

FIG. 12 is a flow diagram describing an embodiment for context identification using content analysis. In this embodiment, the final OCR result takes into account the document structural analysis, the content semantic analysis and the traditional OCR results before outputting the OCR results. The method 1200 is performed by processing logic that comprises hardware (circuitry, dedicated logic, etc.), software (such as is run on a general purpose computing system or a dedicated machine), firmware (embedded software), or any combination thereof. In one embodiment, the method 1200 is performed by device 100 of FIG. 1.

Referring to FIG. 12, an image is obtained at block 1202. In one embodiment, the image is obtained using a camera coupled to a mobile device. Once the image is obtained, at block 1204, a portion of the image comprising a graphical object such as text is identified. A graphical object in an image may include but is not limited to one or more symbols, alphanumeric characters, words, text, signs, or numbers. Text is an example of a graphical object that is used for illustrative purposes while describing FIG. 12; however, any graphical object may be used in conjunction with a similar method. Additionally, graphical illustrations may also be identified at block 1204. A graphical illustration may include a gesture or a graphical representation of an object such as a text word, symbol, etc. For example, an image of an apple is a graphical illustration of the word "apple." Generally, the graphical illustration aids in improving the OCR results for the graphical objects. In one implementation, a rectangular text box is placed around text. Once the text regions are detected at block 1204, the document structure analysis and the content semantic analysis of the text regions may begin in parallel at block 1206.

The document structure analysis commences at block 1208. The document structure analysis focuses on the structure and layout of the graphical objects, such as text, and any identified graphical illustrations to determine the context of the graphical objects. For instance, a dinner menu at a restaurant has a significantly different text layout than a book cover. The document structure analysis may focus on the unary features of the text regions like the font height and also binary features between the text regions. Binary features may include analysis of special arrangements like co-linearity and degree of horizontal and vertical overlap.

Once the portions with text are detected, the content semantic analysis of the document may also commence. At block 1210, a preliminary OCR is performed. The recognized text output from the OCR (block 1212) is used for the content semantic analysis. For instance, once a few words are partially recognized using OCR, various schemes that infer the context using those words may be implemented (block 1214). In one embodiment, a majority voting scheme is used where words belonging to a category most frequently detected is used to construct the context. In another embodiment, domain-specific context may be inferred based on the context. In some embodiments, the content semantic analysis works in conjunction with the document structure analysis to infer the context. For instance, in a restaurant menu, the food names and the price appear together. Similarly, in a book title a person's name appears in relatively small font.

At block 1216, the context from the document structure analysis and content semantic analysis is used for refining the dictionary. A dictionary is an example of a group of graphical objects that is used for illustrative purposes in FIG. 12; however other methods using any group of graphical objects may be utilized. At block 1218, another OCR is performed. The results from the OCR uses the refined dictionary from the document structure analysis and the content semantic analysis generated at block 1216. OCR, at block 1218, may commence in parallel to the document structure analysis and the content semantic analysis once the text regions are detected at block 1206. At block 1220, the output text for the context-sensitive OCR is generated.

It should be appreciated that the specific steps illustrated in FIG. 12 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1200.

Figure 13:
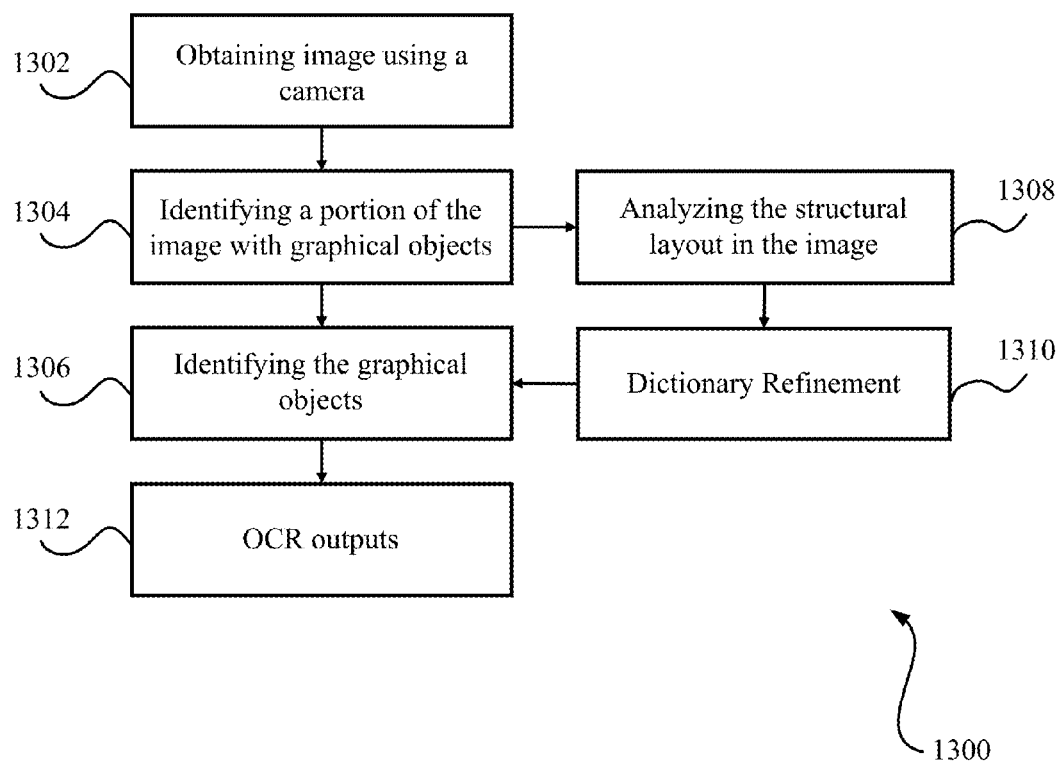
FIG. 13 is a flow diagram describing an embodiment for context identification by analyzing the structural layout of the image.

FIG. 13 is a flow diagram describing an embodiment for context identification by analyzing the structural layout of the image. In one embodiment, the final OCR result takes into account the document structural analysis and the traditional OCR results before outputting the OCR results. The method 1300 is performed by processing logic that comprises hardware (circuitry, dedicated logic, etc.), software (such as is run on a general purpose computing system or a dedicated machine), firmware (embedded software), or any combination thereof. In one embodiment, the method 1300 is performed by device 100 of FIG. 1.

Referring to FIG. 13, an image is obtained at block 1302. In one embodiment, the image is obtained using a camera coupled to a mobile device. Once the image is obtained, at block 1304, a portion of the image comprising a graphical object such as text is identified. A graphical object in an image may include but is not limited to one or more symbols, alphanumeric characters, words, text, signs, or numbers. Text is an example of a graphical object that is used for illustrative purposes while describing FIG. 13; however, any graphical object may be used in conjunction with a similar method. Additionally, graphical illustrations may also be identified at block 1304 (not shown).

A graphical illustration may include a gesture or a graphical representation of an object such as a text word, symbol, etc. For example, an image of an apple is a graphical illustration of the word "apple." Generally, the graphical illustration aids in improving the OCR results for the graphical objects. In one implementation, a rectangular text box is placed around the graphical object. Once one or more portions of the image with the graphical objects and/or graphical illustrations are detected, at block 1304, the document structure analysis may begin in parallel at block 1308.

The document structure analysis commences at block 1308. The document structure analysis focuses on the structure and layout of the graphical objects, such as text, and any identified graphical illustrations to determine the context of the graphical objects. For instance, a dinner menu at a restaurant has a significantly different text layout than a book cover. The document structure analysis may focus on the unary features of the text regions like the font height and also binary features between the graphical objects or the graphical objects and the graphical illustrations. Additional features of the document such as margins and tables may also be considered while generating the document structural analysis. Binary features may include analysis of special arrangements like co-linearity and degree of horizontal and vertical overlap.

At block 1310, the context from the document structure analysis is used for refining the dictionary. A dictionary is an example of a group of graphical objects that is used for illustrative purposes in FIG. 13; however other methods using any group of graphical objects may be utilized. At block 1306, the graphical objects from the image are identified. Another OCR may be performed for identifying the graphical objects. In identifying the graphical objects, the method may use the refined dictionary from the document structure analysis generated at block 1310. At block 1312, the output text for the context-sensitive OCR is generated.

It should be appreciated that the specific steps illustrated in FIG. 13 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1300.

Figure 14:
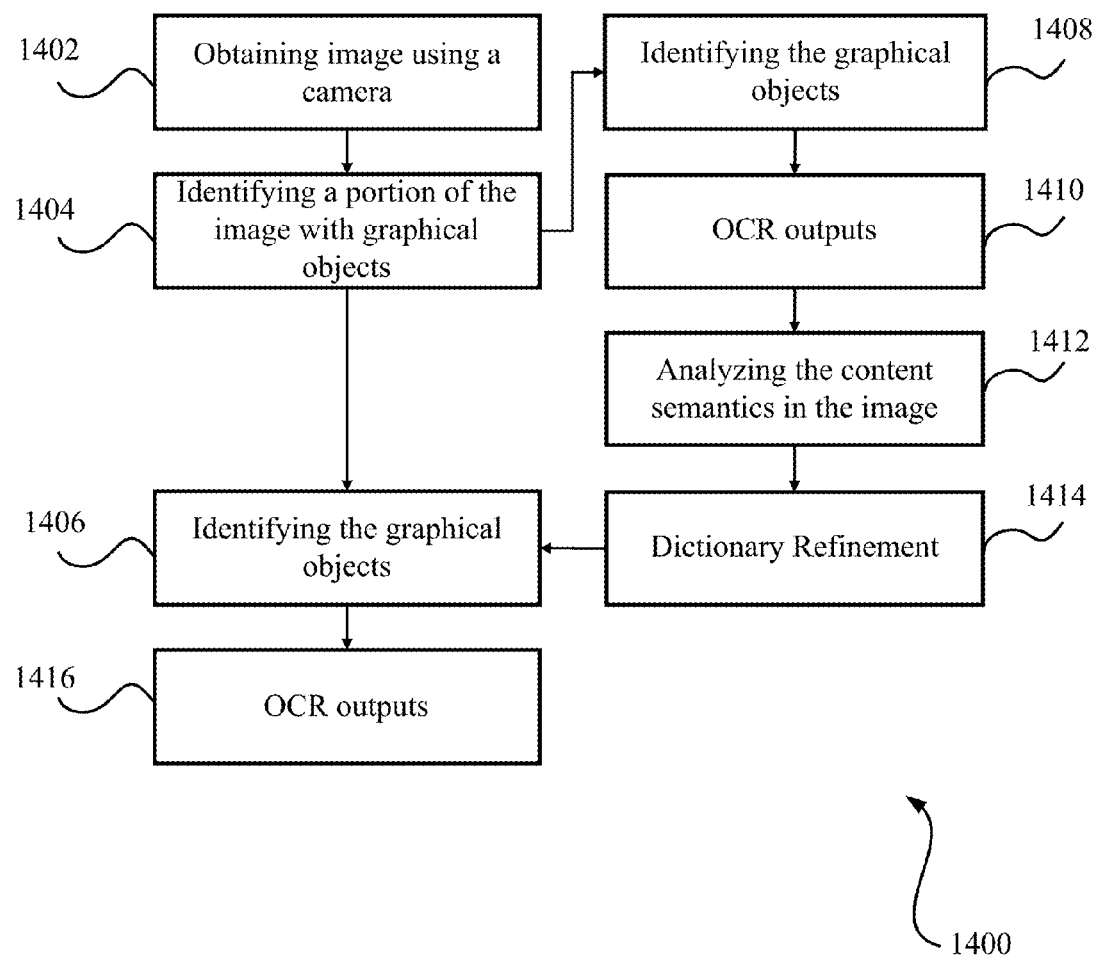
FIG. 14 is a flow diagram describing an embodiment for context identification using content analysis.

FIG. 14 is a flow diagram describing an embodiment for context identification using content analysis. In one embodiment, the final OCR result takes into account the content semantic analysis and the traditional OCR results before outputting the OCR results. The method 1400 is performed by processing logic that comprises hardware (circuitry, dedicated logic, etc.), software (such as is run on a general purpose computing system or a dedicated machine), firmware (embedded software), or any combination thereof. In one embodiment, the method 1400 is performed by device 100 of FIG. 1.

Referring to FIG. 14, an image is obtained at block 1402. In one embodiment, the image is obtained using a camera coupled to a mobile device. Once the image is obtained, at block 1404, a portion of the image comprising a graphical object such as text is identified. A graphical object in an image may include but is not limited to one or more symbols, alphanumeric characters, words, text, signs, or numbers. Text is an example of a graphical object that is used for illustrative purposes while describing FIG. 14; however, any graphical object may be used in conjunction with a similar method. Additionally, graphical illustrations may also be identified at block 1404. A graphical illustration may include a gesture or a graphical representation of an object such as a text word, symbol, etc. For example, an image of an apple is a graphical illustration of the word "apple." Generally, the graphical illustration aids in improving the OCR results for the graphical objects. In one implementation, a rectangular text box is placed around graphical objects. Once the graphical object regions are detected at block 1404, the content semantic analysis of the text regions may begin at block 1408.

Once the portions with graphical objects are detected, the content semantic analysis of the document may commence by identifying the graphical objects (block 1408). At block 1410, a preliminary OCR may be performed. The recognized graphical object output from the OCR (block 1410) is used for the content semantic analysis, at block 1412. For instance, once a few words are partially recognized using OCR, various schemes that infer the context using those words may be implemented. In one embodiment, a majority voting scheme is used where words belonging to a category most frequently detected is used to construct the context. In another embodiment, domain-specific context may be inferred based on the context. In some embodiments, the content semantic analysis works in conjunction with the document structure analysis to infer the context. For instance, in a restaurant menu, the food names and the price appear together.

In one embodiment, at block 1412, analyzing the content semantics is based on analyzing a probability of a co-occurrence amongst the graphical objects. In one aspect of the invention, the context may be determined based on the association of graphical objects such as words found in the image. For example, an Italian menu item is often seen with other Italian menu items. Similarly, subway station names are seen together. The correlation between the words in these groups is relatively very high. A co-occurrence matrix with high correlation words and text blocks may be pre-generated or may be created or updated by training of the device.

In one embodiment, the maximized total co-occurrence rate for a co-occurrence matrix may be represented by the following equation:

$$\max_{(\vec{k},\vec{m})} \left( \sum_{(TB_i, TB_j) \in TB} C(W(TB_i)_{k_i}, W(TB_j)k_j) \right),$$

wherein C represents the co-occurrence matrix, W represents the words, TB represents the text blocks. Usually OCR produces N-best candidates for each text block. Once the OCR selects the N-best candidates for a text block, the co-occurrence matrix may be consulted to select a text block that maximizes the total co-occurrence rate.

Additionally, graphical illustrations may also be used, at block 1412, in analyzing the content semantics in the image. A graphical illustration may include a gesture or a graphical representation of an object such as a text word, symbol, etc. For example, an image of an apple is a graphical illustration of the word "apple." For example, there is a higher probability that the word "apple" will co-occur with an image representing an "apple" than an "orange."

Furthermore, at block 1412, the content semantics are analyzed based on multiple languages. Embodiments of the invention discussing multiple languages are further described in FIG. 16 and FIG. 17. In the method of claim 28, the content semantics are analyzed based on multiple languages.

At block 1414, the context from content semantic analysis is used for refining the dictionary. A dictionary is an example of a group of graphical objects that is used for illustrative purposes in FIG. 14; however other methods using any group of graphical objects may be utilized. At block 1406, another OCR may be performed and the graphical objects are identified. The results from the OCR use the refined dictionary from the content semantic analysis generated at block 1412. At block 1416, the output text for the context-sensitive OCR is generated.

It should be appreciated that the specific steps illustrated in FIG. 14 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1400.

Figure 15:
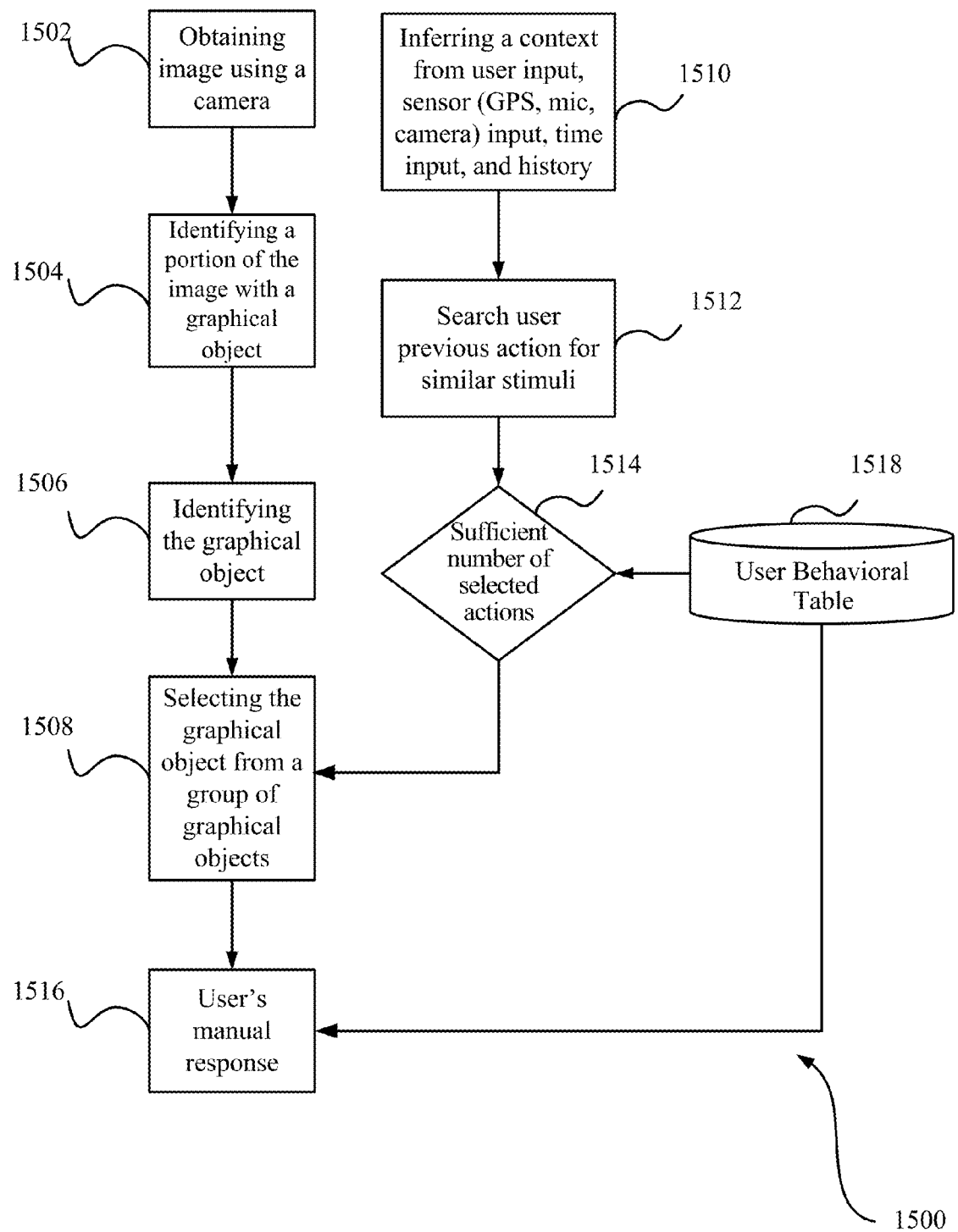
FIG. 15 is a flow diagram, describing an embodiment for context-sensitive OCR using behavioral elements.

FIG. 15 is a flow diagram, describing an embodiment for context-sensitive OCR using behavioral elements. This embodiment uses behavioral elements of the user to refine the context of the user for selecting the dictionary. A dictionary is an example of a group of graphical objects that is used for illustrative purposes in FIG. 15; however other methods using any group of graphical objects may be utilized. The method 1500 is performed by processing logic that comprises hardware (circuitry, dedicated logic, etc.), software (such as is run on a general purpose computing system or a dedicated machine), firmware (embedded software), or any combination thereof. In one embodiment, the method 1500 is performed by device 100 of FIG. 1.

Referring to FIG. 15, an image is obtained at block 1502. In one embodiment, the image is obtained using a camera coupled to a mobile device. Once the image is obtained, at block 1504, a portion of the image comprising a graphical object is identified. A graphical object in an image may include but is not limited to one or more symbols, alphanumeric characters, words, signs, or numbers. In one implementation, a rectangular text box is placed around a graphical object. At block 1506, the graphical objects are partially or fully recognized. In one aspect, OCR is utilized to recognize the graphical objects.

At block 1510, sensor input is received from various input sources, such as GPS, microphone, and camera. Other parameters like time of the day may also be factored into further refining the search. At block 1512, the user's previous actions with similar context are searched using a behavioral database or table (block 1518). The behavioral database is a collection of the most frequently used context by a user and the associated information specific to the user in regard to the context. At block 1514, if a sufficient number of actions are generated or information is gathered that is associated with a particular context, the context is selected and one or more dictionaries are selected that represent the corresponding context. In some embodiments, once the OCR is performed and the results are generated (block 1508), the user may have the ability to verify and rectify any mistakes in the OCR results (block 1516). As shown in the flow diagram, this feedback from the user may be utilized in updating the behavioral table at block 1518.

The table below (Table I) describes an exemplary listing of behavioral activities encountered by a person routinely. Table I may also represent a partial representation of an exemplary behavioral database or table (block 1518).

TABLE I

| History | Location (GPS) | Location (Audio) | Voice command | Time | Focal length (text physical size) | Light condition | User action |
|---|---|---|---|---|---|---|---|
| 1 | Downtown A | Restaurant | Noisy | 6 pm | 30 cm | fluorescent light | Select dinning menu |
| 2 | Changing (Bus) | Car | Noisy | 8 am | 30 cm (small) | Sunlight | Enlarge screen and select a word |
| 3 | Outskirts | Outdoor | Calm | 10 pm | Inf | Dark | Activate HDR functionality |

Table I is also an example of how multiple different embodiments of the invention may be used together to increase the accuracy and further refine the dictionary selected. The feedback from the user helps train the mobile device in making better selections of dictionaries.

Referring to Table I, history 1 represents conditions sensed by the sensors along with behavioral input at a particular time of the day. In the first table entry, GPS determines the location of the mobile device. Additionally, the microphone's input helps determine that the mobile device is inside a specific restaurant. The time of day helps determine that the user of the mobile device is most likely at the restaurant for dinner Components of the mobile device may further refine this selection by comparing the environmental factors to the usual patterns for the user. For instance, if the user has dinner every night at 6 pm, there is a strong probability that the user is having dinner tonight as well, as long as the environmental factors like location, light, noise levels are similar to the routine environmental input for history 1. The distance of the reading material from the user also helps further qualify the text. In this case, the reading material is a dinner menu that is about 30 cms away from the user.

History 2 in the table is the history of the user's behavioral action at about 8 am on weekday mornings. The user location is determined by the GPS and the microphone. The user is usually changing buses around this time of the day. The sensor input also detects a noisy environment with a lot of sunlight. Under these conditions, when the mobile device obtains an image, the user is in the process of changing buses and that is the context. According to that context, the user may perform additional functions that involve enlarging the screen and selecting words.

History 3 in the table is the history of the user at 10 pm. The GPS and the audio input indicate that the user is at the outskirts of the city and is outdoors in a very calm environment. The light conditions are dark and there is no visible text in view. The user's normal action under these conditions is to activate HDR (high dynamic ranging) functionality on their mobile device.

A history of the user activity is used to train the behavioral database. If a user continues to repeat a specific set of actions under specific environmental conditions, the mobile device starts associating those environmental conditions with the user activity and the acquired information may be used to react to similar environmental stimulus in the future.

It should be appreciated that the specific steps illustrated in FIG. 15 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1500.

Figure 16:
FIG. 16 is a block diagram of an exemplary traffic sign in multiple languages.

FIG. 16 is a block diagram of an exemplary traffic sign. The names of the streets are in more than one language next to each other. Multi-lingual traffic signs, menus and popular tourist attractions are common in multi-lingual countries and also in cities with a significant flow of foreign visitors. The presence of two words in two different languages with similar meaning to describe the same interest may be used to increase the accuracy and speed of performing OCR as described further in FIG. 17.

Figure 17:
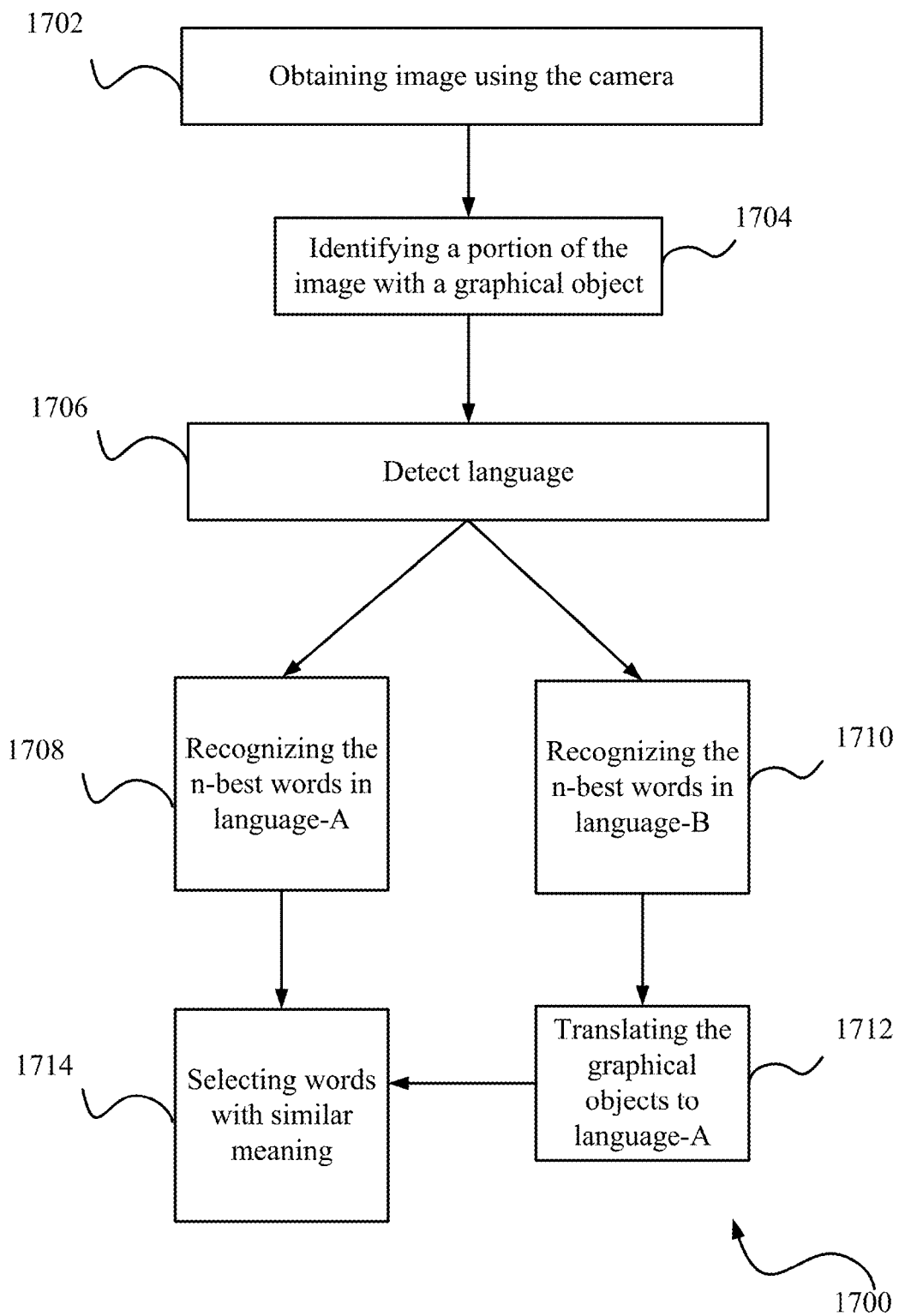
FIG. 17 is a flow diagram describing a method for increasing the accuracy and speed of the OCR results when the signs are in more than one language.

FIG. 17 is a flow diagram describing a method for increasing the accuracy and speed of the OCR results when the signs are in more than one language. The method 1700 is performed by processing logic that comprises hardware (circuitry, dedicated logic, etc.), software (such as is run on a general purpose computing system or a dedicated machine), firmware (embedded software), or any combination thereof. In one embodiment, the method 1300 is performed by device 100 of FIG. 1.

Referring to FIG. 17, an image is obtained at block 1702. In one embodiment, the image is obtained using a camera coupled to a mobile device. Once the image is obtained, at block 1704, a portion of the image comprising a graphical object is identified. A graphical object in an image may include but is not limited to one or more symbols, alphanumeric characters, words, signs, or numbers. In one implementation, a rectangular text box is placed around a graphical object. At block 1706, the graphical objects are partially or fully recognized. In one aspect, OCR is utilized to recognize the graphical objects. The mobile device detects the one or more different languages (A and B in FIG. 17) from the image.

If the frame has more than two languages, more processes may be forked off to detect the language in dictionaries available for each language. At block 1708, words sensed with highest confidence level in language A are detected. Similarly, at block 1710, words sensed with highest confidence level in language B are detected. The detection of words at block 1708 and 1710 may be performed using traditional OCR mechanisms. A word is an example of a graphical object used for illustration purposes while discussing FIG. 17; however, other graphical objects may be used without restriction. For instance, a symbol in different cultures may look different but refer to the same object. At block 1712, the words detected in language B are translated to language A. At block 1714, inputs from 1708 and 1712 are combined to select the best outcome from both OCR detections of the same words using different languages. In one embodiment, the common words detected are directly outputted, and the words with conflicts between the two OCR results are further processed.

It should be appreciated that the specific steps illustrated in FIG. 17 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 17 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1700.

What is claimed:

1. A method for performing Optical Character Recognition (OCR), the method comprising:
    obtaining an image generated by a camera coupled to a device;
    identifying a portion of the image comprising at least one graphical object;
    inferring a non-textual context associated with the image;
    selecting a group of one or more graphical objects based on the non-textual context associated with the image; and
    determining an OCR result of the at least one graphical object using the group of graphical objects.

2. The method of claim 1, wherein determining the OCR result comprises performing an OCR using the group of graphical objects.

3. The method of claim 1, wherein determining the OCR result comprises:
    generating a plurality of OCR candidates for the at least one graphical object by performing an OCR on the at least one graphical object; and
    selecting an OCR candidate from the plurality of OCR candidates using the group of graphical objects.

4. The method of claim 1, further comprising modifying the inferred non-textual context using the OCR result.

5. The method of claim 1, wherein the at least one graphical object comprises one or more of symbols, characters, words, signs, and numbers.

6. The method of claim 1, wherein the group of one or more graphical objects comprises a plurality of graphical objects associated with each other through a common characteristic.

7. The method of claim 1, wherein the group of one or more graphical objects represents a dictionary.

8. The method of claim 1, wherein the group of one or more graphical objects represents a refinement of a dictionary.

9. The method of claim 1, wherein the non-textual context is inferred using a graphical illustration, wherein the graphical illustration comprises one or more gestures, one or more graphical representations of an object, or some combination thereof.

10. The method of claim 1, wherein the non-textual context of the image is inferred using sensor input.

11. The method of claim 10, wherein the sensor input is provided by the camera, a microphone, a light sensor, a clock, a GPS element, or some combination thereof.

12. The method of claim 1, wherein inferring the non-textual context comprises:
    estimating a distance between the camera and the at least one graphical object; and
    inferring the context based on the estimated distance between the camera and the at least one graphical object.

13. The method of claim 1, wherein inferring the non-textual context comprises:
    detecting at least one characteristic associated with a plurality of light rays in an environment where the image is obtained; and
    inferring the context based on the at least one characteristic associated with the plurality of light rays.

14. The method of claim 13, wherein the at least one characteristic associated with the plurality of light rays is brightness, wherein brightness under a threshold results in an inference of obtaining the image indoors and brightness over the threshold results in the inference of obtaining the image outdoors.

15. The method of claim 1, wherein inferring the non-textual context comprises:
    receiving an audio input using a microphone;
    performing pattern recognition on the audio input; and
    inferring the context based on a recognized pattern in the audio input.

16. The method of claim 15, wherein the recognized pattern comprises a voice command from a user.

17. The method of claim 15, wherein the recognized pattern comprises an indication for a location of the camera at a time of receiving the audio input.

18. The method of claim 1, wherein inferring the non-textual context comprises:
    receiving context-related information from a user; and
    inferring the context based on the received context-related information from the user.

19. The method of claim 1, wherein inferring the non-textual context comprises:
    estimating a location of the device; and
    inferring the context based on the estimated location of the device.

20. The method of claim 19, wherein the location of the device is estimated using a GPS element of the device.

21. The method of claim 19, wherein the location of the device is estimated using a strength of a signal in relation to a cell tower.

22. The method of claim 19, wherein the location of the device is estimated using an audio input from a microphone.

23. The method of claim 1, further comprising inferring a textual context, comprising analyzing a plurality of content semantics associated with the image.

24. The method of claim 23, wherein analyzing the plurality of content semantics is based on analyzing a probability of a co-occurrence amongst a plurality of graphical objects.

25. The method of claim 23, wherein analyzing the plurality of content semantics is based on analyzing a relationship amongst at least one graphical object and at least one graphical illustration.

26. The method of claim 25, wherein the at least one graphical illustration comprises a gesture, a graphical representation of an object, or both.

27. The method of claim 23, wherein analyzing the plurality of content semantics is based on analyzing the plurality of content semantics based on multiple languages.

28. A method of claim 27, wherein analyzing the plurality of content semantics based on multiple languages comprises:
identifying one or more portions of the image comprising a first graphical object in a first language and a second graphical object in a second language, wherein the first graphical object and the second graphical object have a similar meaning;
identifying a first plurality of candidates for the first graphical object and a second plurality of candidates for the second graphical object; and
selecting a graphical object from the first plurality of candidates that has a similar meaning to at least one of the second plurality of candidates.

29. The method of claim 28, wherein selecting the graphical object from the first plurality of candidates comprises:
translating the second plurality of candidates for the second graphical object to the first language; and finding at least one graphical object with the similar meaning from the first plurality of candidates to the translated second plurality of candidates.

30. The method of claim 23, wherein inferring the textual context comprises:
identifying at least one graphical object from a plurality of graphical objects; and
inferring the textual context based on the at least one identified graphical object from the plurality of graphical objects.

31. The method of claim 23, wherein inferring the textual context comprises inferring the textual context based on analyzing a structural layout of the image.

32. The method of claim 1, wherein inferring the non-textual context comprises:
detecting an environmental factors using input from at least one sensor;
retrieving a past behavioral response by a user during a presence of a similar environmental factors; and
inferring the non-textual context using the past behavioral response.

33. The method of claim 32, wherein the environmental factor corresponds to a time, a location, a sound, a distance of a subject of the image from the user, or some combination thereof.

34. A device, comprising:
memory; and
a processor coupled to the memory and configured to:
obtain an image from the memory;
identify a portion of the image comprising at least one graphical object;
infer a non-textual context associated with the image;
select a group of graphical objects based on the non-textual context associated with the image; and
determine an Optical Character Recognition (OCR) result of the at least one graphical object using the group of graphical objects.

35. The device of claim 34, wherein determining the OCR result comprises performing an OCR using the group of one or more graphical objects.

36. The device of claim 34, wherein determining the OCR result comprises the processor further configured to:
generate a plurality of OCR candidates for the at least one graphical object by performing an OCR on the at least one graphical object; and
select an OCR candidate from the plurality of OCR candidates using the group of one or more graphical objects.

37. The device of claim 34, further comprising modifying the inferred non-textual context using the OCR result.

38. The device of claim 34, wherein the at least one graphical object comprises one or more of symbols, characters, words, signs, and numbers.

39. The device of claim 34, wherein the group of one or more graphical objects comprises a plurality of graphical objects associated with each other through a common characteristic.

40. The device of claim 34, wherein the group of one or more graphical objects represents a dictionary.

41. The device of claim 34, wherein the group of one or more graphical objects represents a refinement of a dictionary.

42. The device of claim 34, wherein the non-textual context is inferred using a graphical illustration, wherein the graphical illustration comprises one or more gestures, one or more graphical representations of an object, or some combination thereof.

43. The device of claim 34, wherein the non-textual context of the image is inferred using a sensor input.

44. The device of claim 43, wherein the sensor input is provided by the camera, a microphone, a light sensor, a clock, a GPS element, or some combination thereof.

45. The device of claim 34, wherein inferring the non-textual context comprises the processor further configured to:
estimate a distance between the camera and the at least one graphical object; and
infer the context based on the estimated distance between the camera and the at least one graphical object.

46. The device of claim 34, wherein inferring the non-textual context comprises the processor further configured to:
detect at least one characteristic associated with a plurality of light rays in an environment where the image is obtained; and
infer the context based on the at least one characteristic associated with the plurality of light rays.

47. The device of claim 46, wherein the at least one characteristic associated with the plurality of light rays is brightness, wherein brightness under a threshold results in an inference of obtaining the image indoors and brightness over the threshold results in the inference of obtaining the image outdoors.

48. The device of claim 34, wherein inferring the non-textual context comprises the processor further configured to:
receive an audio input using a microphone;
perform pattern recognition on the audio input; and
infer the context based on a recognized pattern in the audio input.

49. The device of claim 48, wherein the recognized pattern comprises a voice command from a user.

50. The device of claim 48, wherein the recognized pattern comprises an indication for a location of the camera at a time of receiving the audio input.

51. The device of claim 50, wherein inferring the non-textual context comprises the processor further configured to:
 receive context-related information from a user; and
 infer the context based on the received context-related information from the user.

52. The device of claim 51, wherein the location of the device is estimated using a strength of a signal in relation to a cell tower.

53. The device of claim 34, wherein inferring the non-textual context comprises the processor further configured to:
 estimate a location of the device; and
 infer the context based on the estimated location of the device.

54. The device of claim 53, wherein the location of the device is estimated using a GPS element of the device.

55. The device of claim 53, wherein the location of the device is estimated using an audio input from a microphone.

56. The device of claim 34, further comprising inferring a textual context, comprising analyzing a plurality of content semantics associated with the image.

57. The device of claim 56, wherein analyzing the plurality of content semantics is based on analyzing a probability of a co-occurrence amongst a plurality of graphical objects.

58. The device of claim 56, wherein analyzing the plurality of content semantics is based on analyzing a relationship amongst at least one graphical object and at least one graphical illustration.

59. The device of claim 58, wherein the at least one graphical illustration comprises a gesture, a graphical representation of an object, or both.

60. A device of claim 58, wherein analyzing the plurality of content semantics based on multiple languages comprises:
 identifying one or more portions of the image comprising a first graphical object in a first language and a second graphical object in a second language, wherein the first graphical object and the second graphical object have a similar meaning;
 identifying a first plurality of candidates for the first graphical object and a second plurality of candidates for the second graphical object; and
 selecting a graphical object from the first plurality of candidates that has a similar meaning to at least one of the second plurality of candidates.

61. The device of claim 60, wherein selecting the graphical object from the first plurality of candidates comprises:
 translating the second plurality of candidates for the second graphical object to the first language; and
 finding at least one graphical object with the similar meaning from the first plurality of candidates to the translated second plurality of candidates.

62. The device of claim 56, wherein analyzing the plurality of content semantics is based on analyzing the plurality of content semantics based on multiple languages.

63. The device of claim 56, wherein inferring the textual context comprises the processor further configured to:
 identify at least one graphical object from a plurality of graphical objects; and
 infer the textual context based on the at least one identified graphical object from the plurality of graphical objects.

64. The device of claim 56, wherein inferring the textual context comprises:
 inferring the textual context based on analyzing a structural layout of the image.

65. The device of claim 34, wherein inferring the non-textual context comprises the processor further configured to:
 detect an environmental factor using input from at least one sensor;
 retrieve a past behavioral response by a user during a presence of a similar environmental factors; and
 infer the context using the past behavioral response by the user.

66. The device of claim 65, wherein the environmental factors corresponds to a time, a location, a sound, a distance of a subject of the image from a user, or some combination thereof.

67. A non-transitory computer-readable storage medium comprising code stored therein and which is executable by a processor of a device to cause the process to:
 obtain an image generated by a camera;
 identify a portion of the image comprising at least one graphical object;
 infer a non-textual context associated with the image;
 select a group of graphical objects based on the non-textual context associated with the image; and
 determine an Optical Character Recognition (OCR) result of the at least one graphical object using the group of graphical objects.

68. The non-transitory computer-readable storage medium of claim 67, wherein improving the OCR result comprises the code further executable to perform an OCR using the group of graphical objects.

69. The non-transitory computer-readable storage medium of claim 67, wherein improving the OCR result comprises the code further executable to:
 generate a plurality of OCR candidates for the at least one graphical object by performing an OCR on the at least one graphical object; and
 select an OCR candidate from the plurality of OCR candidates using the group of graphical objects.

70. An apparatus for performing Optical Character Recognition (OCR), comprising:
 means for obtaining an image generated by a camera coupled to a device;
 means for identifying a portion of the image comprising at least one graphical object;
 means for inferring a non-textual context associated with the image;
 means for selecting a group of graphical objects based on the non-textual context associated with the image; and
 means for determining an OCR result of the at least one graphical object using the group of graphical objects.

71. The apparatus of claim 70, wherein determining the OCR result comprises a means for performing an OCR using the group of one or more graphical objects.

72. The apparatus of claim 70, wherein determining the OCR result comprises:
 means for generating a plurality of OCR candidates for the at least one graphical object by performing an OCR on the at least one graphical object;
 means for selecting an OCR candidate from the plurality of OCR candidates using the group of one or more graphical objects; and
 means for using the selected OCR candidate in improving the OCR result.

* * * * *

UNITED STATES PATENT AND TRADEMARK OFFICE
CERTIFICATE OF CORRECTION

PATENT NO. : 9,082,035 B2  Page 1 of 1
APPLICATION NO. : 13/450016
DATED : July 14, 2015
INVENTOR(S) : Hwang et al.

It is certified that error appears in the above-identified patent and that said Letters Patent is hereby corrected as shown below:

<u>In the Claims:</u>

In Column 27, line 51, Claim 32: please delete "factors" and insert --factor--.

In Column 27, line 54, Claim 32: please delete "factors" and insert --factor--.

In Column 30, line 10, Claim 65: please delete "factors" and insert --factor--.

In Column 30, line 14, Claim 66: please delete "factors" and insert --factor--.

Signed and Sealed this
Eighth Day of December, 2015

Michelle K. Lee
*Director of the United States Patent and Trademark Office*